(12) United States Patent
Thiesen et al.

(10) Patent No.: US 6,595,006 B2
(45) Date of Patent: Jul. 22, 2003

(54) MINIATURE RECIPROCATING HEAT PUMPS AND ENGINES

(75) Inventors: Jack H. Thiesen, Longmont, CO (US); Gary S. Willen, Boulder, CO (US); Robert A. Mohling, Boulder, CO (US)

(73) Assignee: Technology Applications, Inc., Boulder, CO (US)

( * ) Notice: Subject to any disclaimer, the term of this patent is extended or adjusted under 35 U.S.C. 154(b) by 0 days.

(21) Appl. No.: 10/074,366

(22) Filed: Feb. 12, 2002

(65) Prior Publication Data

US 2003/0101732 A9 Jun. 5, 2003

Related U.S. Application Data

(60) Provisional application No. 60/268,523, filed on Feb. 13, 2001, and provisional application No. 60/331,883, filed on Nov. 20, 2001.

(51) Int. Cl.[7] .................................................. F25B 9/00

(52) U.S. Cl. .................. 62/6; 62/3.1; 62/457; 91/42; 60/636

(58) Field of Search .................. 62/6, 3.1, 457; 91/42; 60/636

(56) References Cited

U.S. PATENT DOCUMENTS

| | | | | |
|---|---|---|---|---|
| 3,095,785 A | * | 7/1963 | Cahill | 91/42 |
| 3,230,838 A | * | 1/1966 | Westbrook | 91/42 |
| 4,392,362 A | | 7/1983 | Little | 62/514 |
| 4,417,448 A | * | 11/1983 | Horn et al. | 62/6 |
| 4,671,080 A | | 6/1987 | Gross | 62/467 |
| 4,829,785 A | | 5/1989 | Hersey | 62/467 |
| 5,148,066 A | * | 9/1992 | Beale et al. | 62/6 |
| 5,269,372 A | | 12/1993 | Chu et al. | 165/80.4 |
| 5,323,999 A | | 6/1994 | Bonne et al. | 251/11 |
| 5,336,062 A | | 8/1994 | Richter | 417/413 A |
| 5,380,396 A | | 1/1995 | Shikida et al. | 156/630 |
| 5,417,235 A | | 5/1995 | Wise et al. | 137/1 |
| 5,436,793 A | | 7/1995 | Sanwo et al. | 361/689 |
| 5,441,597 A | | 8/1995 | Bonne et al. | 216/2 |
| 5,457,956 A | | 10/1995 | Bowman et al. | 60/520 |
| 5,491,363 A | | 2/1996 | Yoshikawa | 257/715 |
| 5,696,405 A | | 12/1997 | Weld | 257/714 |
| 5,699,668 A | * | 12/1997 | Cox | 62/3.1 |
| 5,763,998 A | | 6/1998 | Colombo et al. | 313/495 |
| 5,788,468 A | | 8/1998 | Dewa et al. | 417/415 |
| 5,871,336 A | | 2/1999 | Young | 417/207 |
| 5,932,940 A | | 8/1999 | Epstein et al. | 310/40 MM |
| 5,941,079 A | * | 8/1999 | Bowman et al. | 62/6 |
| 5,981,071 A | | 11/1999 | Cox | 428/408 |

(List continued on next page.)

OTHER PUBLICATIONS

Bailey, D.K. et al., "Single phase forced convection heat transfer in microgeometries—a review," IECEC Paper No. ES–396 (1995) pp 301–310.

(List continued on next page.)

*Primary Examiner*—Ronald Capossela
(74) *Attorney, Agent, or Firm*—Greenlee, Winner and Sullivan, P.C.

(57) ABSTRACT

The present invention discloses a miniature thermodynamic device that can be constructed using standard microfabrication techniques. The device can be used to provide cooling, generate power, compress gases, pump fluids and reduce pressure below ambient (operate as a vacuum pump). Embodiments of the invention relating to the production of a cooling effect and the generation of electrical power, change the thermodynamic state of the system by extracting energy from a pressurized fluid. Energy extraction is attained using an expansion process, which is as nearly isentropic as possible for the appropriately chosen fluid. An isentropic expansion occurs when a compressed gas does work to expand, and in the disclosed embodiments, the gas does work by overcoming either an electrostatic or a magnetic force.

29 Claims, 13 Drawing Sheets

U.S. PATENT DOCUMENTS

| | | |
|---|---|---|
| 6,019,882 A | 2/2000 | Paul et al. .................. 204/450 |
| 6,055,899 A | 5/2000 | Feit et al. ..................... 92/154 |
| 6,106,245 A | 8/2000 | Cabuz ........................ 417/322 |
| 6,109,222 A | 8/2000 | Glezer et al. ............. 126/46 R |
| 6,109,889 A | 8/2000 | Zengerle et al. ......... 417/413.2 |
| 6,157,029 A | 12/2000 | Chutjian et al. ............ 250/292 |

OTHER PUBLICATIONS

Breuer, K. S. et al., "Challenges for Lubrication in High Speed MEMS," book chapter in NanoTribology, Ed. S. Hsu and Z. Ying, Kluwer Press (Feb. 2003).

Elwenspoek, M. et al., "Silicon Micromachining," Chapter 16, Cambridge University Press (1998) pp 388–397.

Ghazavi, P. et. al "A Numerical Model for MOSFET's from Liquid–Nitrogen Temperature to Room Temperature", (1995) IEEE Transactions on Electron Devices, vol. 42, No. 1, pp. 123–134.

Goodling, J.S. and Knight, R.W., "Optimal design of microchannel heat sinks: a review," (1994) ASME HTD 279:65–77.

Harms, T.M. et al., "Experimental investigation of heat transfer and pressure drop through deep microchannels in a (110) silicon substrate," (1997) ASME HTD 351:347–357.

Knight, R.W. et al., "Optimal thermal design of air cooled forced convection finned heat sinks—experimental verification," (1992) ITHERM 206–212.

Knighton, C.D. and Estep, G., "Optimize thermoelectric coolers to improve system performance," (1995) *Laser Focus World* 205–213.

Kolander, W.L. and Lyon, Jr., H.B., "Thermoelectric cooler utility for electronic applications," (1996) ASME HTD 329:117–124.

McCarty, R., "Thermodynamic Properties of Helium 4 from 2 to 1500 K at Pressures to $10^8$ Pa," Journal of Physical and Chemical Reference Data, (1973) vol. 2, No. 4, pp. 923–1042.

Piron, M. et al., "Rapid Computer Aided Design Method for Fast–Acting Solenoid Actuators," IEEE Transactions on Industry Applications, (1999) vol. 35, No. 5, pp. 991–999.

Rahman, M. F. et al., "Position Estimation in Solenoid Actuators," IEEE Transactions on Industry Applications, vol. 32, No. 3, pp. 552–558, 1996.

Rai–Choudhury, P. (Editor), "Handbook of Microlithography, Micromachining, and Microfabrication," SPIE Press (1997) p 408–427.

Ravigururajan, T.S., "Impact of channel geometry on two–phase flow heat transfer characteristics of refrigerants in microchannel heat exchangers," (May 1998) *ASME J. of Heat Transfer* 120:485–491.

Ravigururajan, T.S. et al., "Effects of heat flux on two–hase flow characteristics of refrigerant flows in a micro–channel heat exchanger," (1996) ASME HTD 329:167–178.

Remsburg, R., "Advanced Thermal Design of Electronic Equipment," Chapman Hall, (1997) pp. 437–490.

Simoen, E. et. al "The Cryogenic Operation of Partially Depleted Silicon–on–Insulator Inverters," IEEE Transactions on Electron Devices, vol. 42, No. 6, pp. 1100–1105, 1995.

Smythe, R.M., "Methods of designing thermoelectric cooling devices for specific applications," (1996) ASTM HTD 329:135–142.

Webb, R.L. et al., "Advanced heat exchange technology for thermoelectric cooling devices," (1996) ASME HTD 329:125–133.

Yuan, K.Y. and Chen, S.C., "A new algorithm for coupled solutions of electric, magnetic, and mechanical systems in dynamic simulation of solenoid actuators," (1990) IEEE Transactions on Magnetics 26(3):1189–1197.

* cited by examiner (flexure approach)

(expander, step 1)

(expander, step 2)

(expander, step 3)

(expander, step 4)

(engine, step 1)

(engine, step 2)

(engine, step 3)

(engine, step 4)

MINIATURE RECIPROCATING HEAT PUMPS AND ENGINES

CROSS-REFERENCE TO RELATED APPLICATIONS

This application claims priority to U.S. provisional application serial No. 60/268,523, filed Feb. 13, 2001, and U.S. provisional application serial No. 60/331,883, filed Nov. 20, 2001 which are both hereby incorporated by reference in their entirety to the extent not inconsistent herewith.

STATEMENT REGARDING FEDERALLY SPONSORED RESEARCH OR DEVELOPMENT

Portions of this invention were made with U.S. Government support under Air Force Contract Number F29801-00-C-0188 awarded by the Air Force and this invention was made with Government support under contract NAS2-01042 awarded by NASA. The Government has certain rights in this invention.

BACKGROUND OF THE INVENTION

This invention relates generally to devices for cooling, generating power, compressing, pumping, and evacuating to pressure below ambient.

There are numerous references in the literature to miniaturized devices whose recent appearance is coincident with the application of microfabrication processes to the production of mechanical systems. Microfabrication processes are those typically associated with integrated circuit production, but more generally include processes capable of producing components and assemblies with micron-sized features and producing a plurality of assemblies or components simultaneously or in "batches". The fine dimensional tolerances of microfabrication processes means that entire classes of novel miniaturized machines can be realized. The ability to produce multiple parts simultaneously means that in many cases these novel machines may be produced efficiently and in great numbers; batching leads to economy-of-scale reduction in the production costs.

The realization that many macroscopic machines can be fully miniaturized has led to a class of devices; for examples see "Silicon Micromachining", Cambridge University Press, 1998 and "Handbook of Microlithography, Micromachining, and Microfabrication", SPIE Press, 1997, incorporated herein by reference to the extent not inconsistent herewith.

One way to enhance microelectronic system efficiency as well as increase reliability is to cool electronic devices to temperatures that substantially reduce power consumption/generation. This however, implies a substantial cooling system. The large heat density produced by present generation electronics is one of the main problems facing present cooling systems. Present heat densities are now exceeding 30 W/cm$^2$. However, if these same circuits could be cooled to cryogenic temperatures, they could operate at higher frequencies, with reduced power, more reliably, and at lower voltages as indicated in the references by E. Simoen and P. Ghazavi (citations below).

Three of the most important considerations facing any novel active cooling technology are cost of implementation, reliability, and efficiency. If the cooling device is prohibitively expensive and/or unreliable or if the cooling device uses substantially more power than is saved, many of the benefits derived from cooling vanish. Efficiency is especially important when cryogenic cooling is considered, since most common cryogenic systems operate at only a few percent of Carnot efficiency.

Present cooling and refrigeration technologies are unable to satisfy present demands. For example, as CMOS electronics have approached the 0.18 µm gate size, they have begun to generate heat densities that require active cooling if these electronic devices are to operate efficiently and reliably. To date there have been many proposed solutions to the problem of cooling very dense microelectronics, but very few of these proposals provide substantial sub-ambient cooling power, and none do so efficiently.

There are also many applications for cryogenic cooling, which extend beyond the needs of conventional electronics, such as superconducting electronics and infrared imaging sensors cooled to temperatures of 35 K and below. There are many applications for which superconducting electronics, operating at both high (70–35 K) and low (35–4 K) temperatures, provide the only feasible solution. Likewise there are many high-precision long-wavelength remote sensing applications, which can only be realized if the sensing detector is maintained at very low temperatures. Often, however these applications have limited space available for the cryogenic system and limited power with which to drive such a system. These two requirements greatly increase the cost and difficulty of realizing present cryogenic support systems.

Present cryogenic cooling technologies suffer from one or more of the following limitations: limited lifetime, high cost, large size, excessive weight, vibration, and ineffective integration with the objects to be cooled. Commercial and tactical cryocoolers that operate at liquid nitrogen temperatures cost on the order of tens of thousands of dollars, generally have lifetimes of less than two years, have limited heat lift, and do not incorporate effective vibration control. Low-temperature cryocoolers, such as Gifford-McMahon cryocoolers, weigh several hundred pounds, have high vibration, and require several kilowatts of power input for a few watts of heat lift at 10 K and below. Aerospace cryocoolers that have long lifetimes and vibration control can cost over one million dollars each. These cryocoolers have high efficiency for temperatures above 50 K; however, as their operating temperature decreases, their efficiency gets much worse, and their practical minimum temperature is about 30 K. Further, all present cryocoolers require complex and expensive assembly procedures that do not readily lend themselves to mass production; therefore, they are limited in their capacity to enjoy economy of scale cost reductions.

For all of these reasons, there has been a need in developing miniaturized and highly efficient cryogenic systems using Micro-Electro-Mechanical Systems (MEMS) technologies. For example, see U.S. Pat. Nos. 5,932,940, 5,941,079, and 5,457,956. Unfortunately, applying the common principles of refrigeration and cryogenic design to systems with dimensional scales of microns and millimeters has posed substantial problems. For example, U.S. Pat. No. 5,932,940 proposes a reverse Brayton cycle refrigerator, but to extract useful amounts of heat the proposed system must operate at very large rotational speeds, 300–1000 krpms. Among the many technical challenges presented in reducing such a design to practice is the fact that this turbine speed requires complex load bearing assemblies; refer to K. S. Breuer et al. "Challenges for High-Speed Lubrication in MEMS". To operate properly, these bearings must be fabricated with such precision that present MEMS process technologies are not capable of satisfying the requirements.

U.S. Pat. Nos. 5,457,956 and 5,941,079 appear to require a material that has thermal properties outside those of known materials. In addition, the frequency at which these proposed MEMS compressors must operate to produce a useful cooling effect is too high for an efficient resonant system.

Chemical charge storage batteries have provided the majority of the portable energy sources for powering portable electronics. Such batteries, however, are limited in both power density and lifetime, particularly when it is desired that the power source be reusable. For these reasons and since the power demands of portable electronic devices have been steadily increasing, chemical batteries have become increasingly inadequate. By comparison to batteries, heat engines, such as internal combustion engines, generate large amounts of power, but are typically massive, making them incompatible with portable applications. One of the reasons that heat engines produce large amounts of power results from the large energy density of liquid fuels, much larger per unit mass than any known charge storage device. Thus, if liquid fuels or pressurized gases can be used to drive a miniaturized electrical power generator, the result would be a revolution in portable energy technology which would enjoy increased operating times at higher levels of power consumption, reduced operating expense, higher levels of reusability, and a more environmentally benign operational effect.

Of the proposed solutions to portable power generation, two examples are found in U.S. Pat. Nos. 5,932,940 and 6,109,222. U.S. Pat. No. 5,932,940 proposes a microscale gas turbine operating at very large rotational speeds, which can collect the energy released during the gas-phase combustion of a fuel and oxidizer, and convert it into electrical energy. The miniaturization of the gas turbine provides many technical advantages. However, the very large rotational speed required to produce useful effects has presented severe difficulties in producing an operating device, chief among them the fabrication of high precision gas-bearings. The tolerance requirements of these bearings have made implementation very difficult and will quite dramatically increase production costs; refer to K. S. Breuer et al. "Challenges for High-Speed Lubrication in MEMS".

On the other hand, U.S. Pat. No. 6,109,222 proposes a micro/meso-scale reciprocating piston that oscillates between combustion cylinders. In this case, the energy released during combustion of the gas-phase products is collected either mechanically from gas jets or via magnetic commutation. Again, it is not clear an operating device can be prepared with the needed efficiency or reliability. In fact all other presently proposed miniaturized power-generation technologies seem to have practical limitations to their usefulness including limited energy generation capabilities, questionable reliability, severe operational inefficiencies, complicated and expensive manufacture, and the requirement for tolerances which presently exceed capabilities of microfabrication processes.

There are numerous potential applications for miniaturized pumps for moving fluid volumes and compressors for increasing gas pressures. Such pumps (or compressors for gases) can be used to control scaled-down chemical processes, to meter fluids, circulate compressed fluids for temperature control processes, dispense medicines, and actuate miniaturized hydraulic systems. Many MEMS pumps have been proposed; representative examples can be found in U.S. Pat. Nos. 5,932,940, 6,109,889, 5,336,062, 6,106,245, 6,019,882, and 5,788,468. All of these inventions have limitations; U.S. Pat. No. 5,932,940 has the same limitations detailed previously. U.S. Pat. Nos. 6,109,889 and 5,336,062 are suited to very small applications when neither a large pressure head nor a significant volume is required; these two pumps are involved almost exclusively with micrometering applications and are not suited for more robust general purpose pumping applications. U.S. Pat. No. 6,106,245 discloses a diaphragm pump, with an electrostatically actuated polymer diaphragm. To move significant amounts of fluids at useful pressures, a number of these pumps would have to be ganged in a series-parallel configuration. Further, the continuously flexing diaphragm introduces a serious reliability issue, especially considering that the diaphragm is fashioned from a polymer and in some configurations is bi-stable exhibiting a "snapping" behavior. U.S. Pat. No. 6,019,882 discloses an electro-osmotic pump. The electro-osmotic process is observed when an electrolyte, a liquid containing solvated ions, comes into contact with a solid under the influence of an electric field. Because an electrolyte forms a charged layer at the interface between the solid and the liquid, an electric field can produce a net drift of the charged species, resulting in fluid flow at increased pressure. As disclosed in U.S. Pat. No. 6,019,882, the electro-osmotic effect is significant for porous media and in this case, the system can generate very large hydraulic pressures. The drawback to this invention is the fact that this effect is only observed for special fluids containing ionic species; thus to pump any fluid in which ionic species are not present requires a complex secondary pumping system. In fact pumping vaporized fluids, as proposed in U.S. Pat. No. 6,019,882, will almost certainly involve the fabrication of a diaphragm-based pump, with some of the same reliability limitations affecting U.S. Pat. No. 6,106,245. The diaphragm-based design will be required to maintain isolation between the electrolyte and the fluid being pumped.

Unlike the preceding patents which all use some form of electric actuation to realize a miniaturized pump, U.S. Pat. No. 5,788,468 deals with a magnetically actuated pump. And while magnetic actuation is a useful means for reducing the operational voltage, this invention has several limitations. For example, the disclosed invention, and more importantly the technique for its manufacture, describes devices whose actuation vectors are parallel to the substrate upon which the devices are fabricated, severely limiting the volume of fluid that may be moved per stroke. Further, since generating large pressures is proportional to the ability to fabricate electromagnetic coils with large Ampere-turns, it is not clear that any of the proposed embodiments could functionally enjoy the benefits of batch fabrication, operate at high electrical power efficiencies, or have extended operational lifetimes.

All of the presently proposed miniaturized pumps suffer from one of the following deficiencies: limited mass flow capabilities ($\mu$l/min), difficult and expensive fabrication processes, excessive valve leakage, inefficient and unreliable operation, and very low pressure heads (less than an atmosphere).

Finally, a miniaturized vacuum system is essential to any number of novel miniaturized systems presently under development. For example, many forms of chemical and scientific testing cannot be performed under conditions other than at reduced pressures. Recently there has been a great deal of interest in the fabrication of miniaturized sensing and analysis devices many of which would benefit from a highly portable, compact, low-power, and efficient method for evacuating a fixed volume and/or maintaining pressures reduced below ambient hereafter referred to as a vacuum. An example of such applications is miniaturized mass-spectrometry; e.g., U.S. Pat. No. 6,157,029. Likewise, a large number of electronic devices, such as field emission tips and miniaturized vacuum tubes, require the maintenance of vacuum to operate; e.g., U.S. Pat. No. 5,763,998. Due to fabrication limitations, the sealed vacuum enclosures of the electronic systems often have significant leak rates. The long-term consequence of these leaks is of course degraded performance. Such systems could clearly benefit from an inexpensive, highly compact vacuum system that could be incorporated into the system architecture and periodically refresh the vacuum of the enclosed devices. Several miniaturized vacuum pumps have been proposed; e.g., U.S. Pat. No. 5,871,336. The invention described in U.S. Pat. No. 5,871,336 can only evacuate very small volumes and under very small flows of higher-pressure gas.

There is a need in the art for improved cooling systems, power generation devices, pumping systems, and vacuum systems.

SUMMARY OF THE INVENTION

The present invention provides devices and methods for cooling, generating power, pumping fluids/compressing gases, and producing a vacuum. These devices and methods are capable of being miniaturized, use a reciprocating piston, are highly efficient, and are capable of being mass-produced using the broad class of microfabrication techniques mentioned above and informally known as Micro-Electro-Mechanical Systems (MEMS) processes or conventional processes.

In one embodiment, the present invention is a highly compact, modular, low-cost, lightweight, miniaturized heat pump/heat engine. This heat pump/heat engine can be used to produce significant amounts of cooling down to cryogenic temperatures, to generate significant amounts of power, to pump substantial amounts of fluids, to compress gases, and to produce a vacuum.

More specifically, there is provided a fluid expander comprising: a housing defining an enclosed work space and having a working fluid, said housing comprising: a first end forming a first plate of a capacitor; a piston slidably disposed in the housing for reciprocating motion to define a variable volume within said housing, said piston having a first side forming a second plate of a capacitor, said second plate in electrostatic or magnetic connection with said first plate; and a control circuit linked to said piston and said first end which controls the strength of the electrostatic or magnetic force between the plates of the capacitor.

The description above describes a single-stage device. It should be recognized that any of the devices described herein may operate as single-stage (single-acting) devices or double-stage (double-acting) devices. For example, in the expander described above, a double-acting device is formed by adding a second end to the housing. In the double-acting device, the piston is slidably disposed in the housing between the first end and the second end for reciprocating motion to define a variable volume within the housing. In addition to the first side of the piston which forms a first capacitor with the first end, in double-acting devices, the piston has a second side in electrostatic connection with the second end of the housing and forms a second capacitor. Also, the control circuit linked to the piston controls the strength of the electrostatic or magnetic force between the first end and the piston and the second end and the piston.

Also provided are methods of using the devices described herein. One exemplary method of use is a method of expanding a gas, the method comprising: applying a clamping voltage between a piston slidably disposed in a housing and a first end of said housing, wherein said piston moves toward said first end but does not contact said first end; allowing a working fluid (pressurized gas, for example) to enter the space between said first end of said housing and said piston; releasing the clamping voltage between said piston and said first end, whereby said piston moves away from said first end and said working fluid is expanded. The expansions described herein are isentropic (i.e., constant entropy). It is understood that a completely isentropic process is impossible because of various losses described herein and known to the art. When the term "isentropic" is used herein, it is to be understood that processes that are physically obtainable are referred to, including those processes where the losses, which cause an isentropic process to move from the ideal, are minimized to the extent possible and practical.

All methods described herein may be single-acting or double acting, where the device configuration is altered as discussed above. In double-acting devices, while the piston is energized with respect to the first end of the housing and an associated change in thermodynamic state is occurring in the first end, the mechanical motion of the second end of the housing is preparing the second end for such action in a complementary way. In a double-acting expander, the method comprises: applying a clamping voltage between a piston slidably disposed in a housing and a first end of the housing, the housing defining an enclosed work space and the housing comprising a first end having at least one inlet and at least one outlet and a second end having at least one inlet and at least one outlet, wherein the piston moves toward the first end but does not contact the first end; allowing a working fluid to enter the space between the first end of said housing and the piston; releasing the clamping voltage between the piston and the first end, wherein the working fluid is isentropically expanded and the piston moves away from the first end and toward the second end; applying a clamping voltage between the piston and the second end of the housing, wherein the piston moves toward the second end but does not contact the second end; allowing a working fluid to enter the space between the second end of the housing and the piston; releasing the clamping voltage between the piston and the second end, wherein the working fluid is isentropically expanded and the piston moves away from the second end and toward the first end. The cycle can be repeated as desired.

As used herein, energizing or activating means a suitable force is applied to a component (piston, for example), or section (capacitor formed between the piston and first end, for example) to produce the desired effect. As described herein, the piston may be energized electrically or magnetically, or using a combination of both methods.

Also provided is a method of generating power comprising: placing a combustible substance in the first end of a housing having a first end and a second end and a piston slidably disposed in said housing for reciprocating motion to define a variable volume within the housing, the piston having a first side in electrostatic or magnetic connection with the first end of said housing and forming a first capacitor and a second side in electrostatic or magnetic connection with the second end of the housing and forming a second capacitor; energizing the piston by applying a force to the piston so that the piston is moved toward the first end; igniting the combustible substance, thereby increasing the temperature and pressure in the first end; reducing the force on the piston allowing the combustible substance to expand against the energized capacitors formed by the piston and the housing, thereby generating power. The power may be harnessed or transferred by any means known in the art.

Also provided is another method of generating power comprising: applying a clamping voltage between the first end of a housing and a piston slidably disposed in the housing and in electrical or magnetic connection with the first end of the housing; admitting heated gas or fluid into the first end of a housing; releasing the clamping voltage on the piston; allowing the piston to expand away from the first end, thereby generating power. This heated gas may be supplied by heat generated from any source including the type of heat generated from electronics or by combustion products.

Also provided is a method of pumping a substance comprising: placing a compressible substance in the first end of a housing having a first end having at least one inlet and at least one outlet, and a second end having at least one inlet and at least one outlet, a piston slidably disposed in the housing between the first end and the second end for reciprocating motion to define a variable volume within the housing, the piston having a first side in electrostatic or magnetic connection with the first end of the housing and forming a first capacitor, the piston having a second side in electrostatic connection with the second end of the housing and forming a second capacitor; energizing the piston by applying a force to the piston so that the piston moves toward the first end, whereby the temperature and pressure of the compressible substance are increased; removing the compressible substance from the first end of the housing. A means for double action is also provided by placing a compressible substance in the second end of the housing, energizing the piston by applying a force to the piston so that the piston moves toward the second end, whereby the temperature and pressure of the compressible substance are increased; removing the compressible substance from the second end of the housing.

Also provided is a method of reducing the pressure in a vessel in gas or fluid connection with a housing comprising: simultaneously minimizing the volume of the first end of a housing having a first end and a second end, separated by a piston slidably disposed in the housing between the first end and the second end for reciprocating motion to define a variable volume within the housing, the piston having a first side in electrostatic or magnetic connection with the first end of the housing and forming a first capacitor and a second side in electrostatic or magnetic connection with the second end of the housing and forming a second capacitor; when the second end has the volume maximized, thereby reducing the pressure in the second volume. Gas at a higher pressure than that present in the second end is then admitted from the vessel into the second end raising the pressure of the second end and incrementally decreasing the pressure of the vessel. The gas in the second end is expelled through an outlet by energizing the piston so that it moves toward the second end reducing the volume of the second end simultaneously increasing the volume of the first end reducing the pressure of the gas in the first end, thereby providing a means for double action when the volume of the second end has been minimized and the volume of the first end has been maximized.

Also provided are ways of using the devices described herein in a cooling system, for example comprising: a cooler in thermal connection with an object to be cooled; a compressor comprising a housing having a first end having at least one inlet and at least one outlet, a second end having at least one inlet and at least one outlet; a piston slidably disposed in the housing between said first end and said second end for reciprocating motion to define a variable volume within said housing, said piston having a first side in electrostatic or magnetic connection with said first end of said housing and forming a first capacitor, said piston having a second side in electrostatic connection with said second end of said housing and forming a second capacitor; and means for providing electrical or magnetic control to said device, said compressor in fluid or gas connection with said cooler; a heat exchanger in fluid or gas connection with said compressor and said cooler, whereby in operation, cooling is provided to the desired level. Also provided is a means whereby the cooler may be an expander, which uses the expansion method, provided herein.

Also provided is a cooling system comprising: a precooler; a compressor in fluid connection with said precooler; a first heat exchanger in fluid connection with said compressor; an expander in fluid or gas connection with said first heat exchanger, said expander comprising a first end having at least one inlet and at least one outlet, a second end having at least one inlet and at least one outlet, a piston slidably disposed in the housing between said first end and said second end for reciprocating motion to define a variable volume within said housing, said piston having a first side in electrostatic or magnetic connection with said first end of said housing and forming a first capacitor, said piston having a second side in electrostatic connection with said second end of said housing and forming a second capacitor; a second heat exchanger in fluid or gas connection with said expander; control electronics which are in electrical connection with said expander and said compressor. Also provided is a means whereby said precooler may be an expander using the method of expansion described herein.

Also provided is a method for mechanical voltage/energy conversion comprising: applying a force between a first end of a housing and a piston in a housing having a first end having at least one inlet and at least one outlet, a second end having at least one inlet and at least one outlet, and a piston slidably disposed in the housing between said first end and said second end for reciprocating motion to define a variable volume within said housing, said piston having a first side in electrostatic or magnetic connection with said first end of said housing and forming a first capacitor, said piston having a second side in electrostatic connection with said second end of said housing and forming a second capacitor; opening said inlet to said first end; inserting gas into said first end through said inlet; reducing the force between said first end and said piston so that said piston is able to move; closing the inlet valve to said first end, whereby the gas in said first end expands, increasing the electrical potential between the first end and the piston.

Also provided is a means whereby electrostatic forces may be used to align the piston to the electrodes. This self-aligned structure can be formed as described herein and known to one of ordinary skill in the art. The invention may be used as a liquefaction system for various gases, as will be evident from the disclosure. The devices may be operated continuously by repeating the steps, as known in the art.

Other uses for the devices described herein are included in the invention and will be readily apparent to one of ordinary skill in the art.

DETAILED DESCRIPTION OF THE INVENTION

Figure 1A:
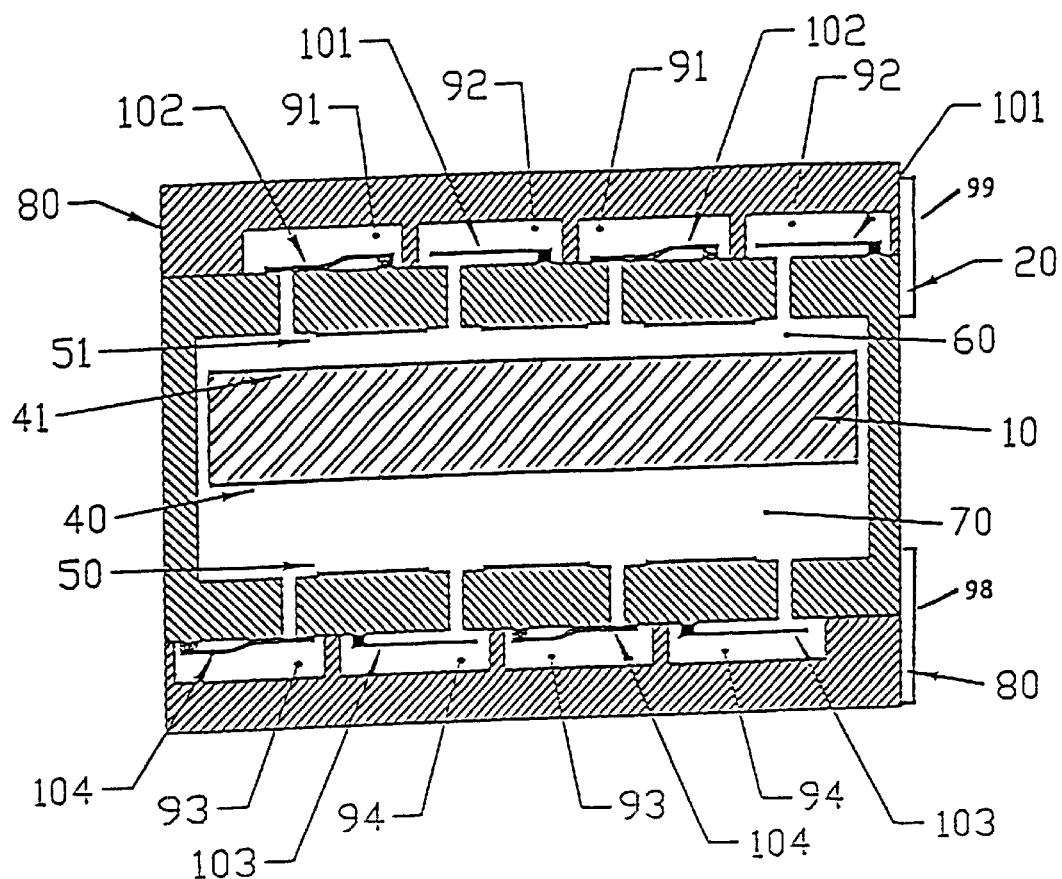
FIG. 1A is a sectional view showing the heat pump/heat engine
Figure 1B:
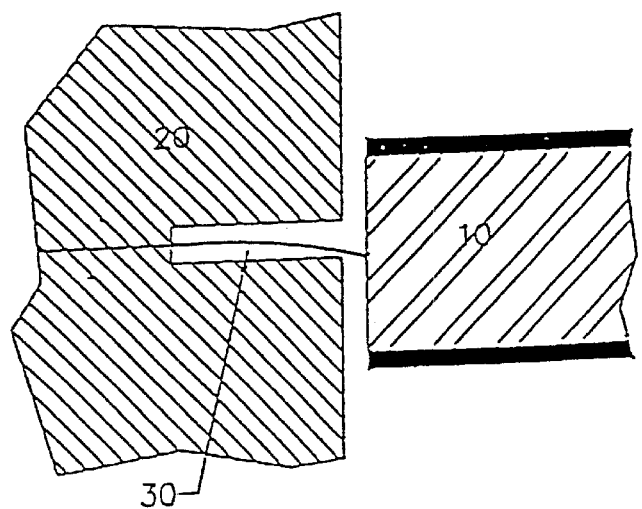
FIG. 1B shows the flexure approach

The invention will be better understood by reference to the following discussion when read in conjunction with the appropriate drawings in which like reference characters refer to like parts throughout the views. There are some common components in the various embodiments of the invention (see FIG. 1A), namely: piston (10) which has magnetically or electrostatically actuated members (41) and (40) formed of a suitable material housing (20) which surrounds piston (10) without contacting the sides of piston (10), having a first end (98) and a second end (99) which contain magnetically or an electrostatically actuated members (50, 51) which permit application of a force between piston (10) and housing (20). Housing (20) contains a volume between the face of the piston and the upper housing wall hereafter referred to as a first portion or reaction chamber or pressure chamber (60) and a volume between the face of the piston and the lower housing wall hereafter referred to as a second portion or reaction chamber or pressure chamber (70) that permits a double action during every cycle. Housing (20) contains valves (101, 102, 103, 104) which are formed on the upper or lower ends, which allow the pressure chambers to communicate with manifold structures (80) that allow inlet and outlet fluid streams (91,92,93, 94) to communicate with the valves (101, 102, 103, 104). Piston (10) preferably has a small clearance between the housing sides. There may be solid members called flexures (30) (see FIG. 1B) that connect piston (10) to housing (20) so that electrical connections can be made to piston (10) and to prevent misalignment between piston (10) and housing (20). Piston (10) may also be electrically connected to housing (20) by a wire or spring (not shown).

These common components operate under a common operational cycle that varies somewhat in detail given the particular aspect of the present invention under consideration, but which in general has three common steps. The operation of the different embodiments of the devices all begin with the same first step; fluid from manifold (92) is admitted into the reaction chamber by opening inlet valve(s) (101). When the reaction chamber is filled to the desired pressure, inlet valve(s) (101) are closed and the thermodynamic state of the admitted fluid is changed. Specific cycle details then define the various embodiments of the present invention. The operation of the device is discussed in more detail below.

Figure 2:
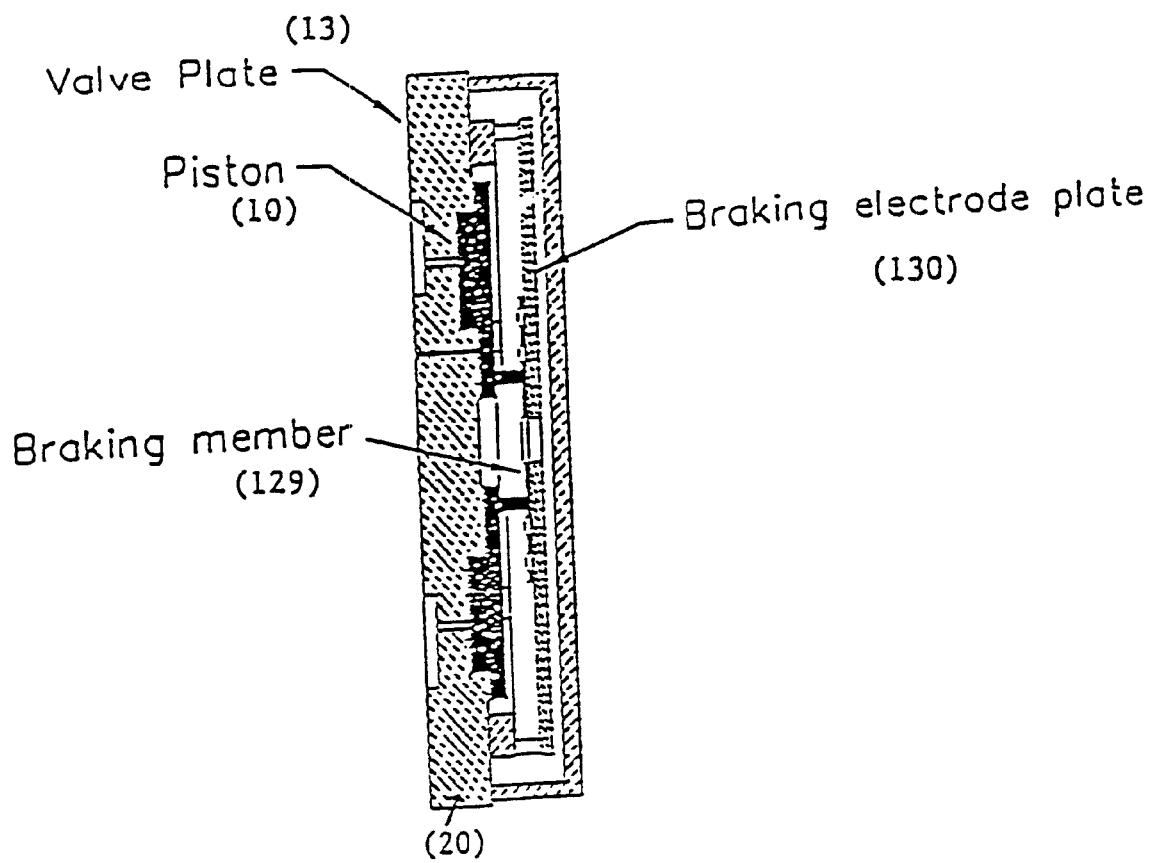
FIG. 2 shows a single acting device.

FIG. 2 shows a single-acting device where piston (10) containing a braking member (129) positioned in housing (20) which contains a braking electrode plate (130). Braking electrode plate (130) is not in electrical or physical contact with piston (10). Braking electrode plate (130) is in structural contact with housing (20). Braking member (120) and braking electrode plate (130) form a braking capacitor. In operation of a single acting device, a force must be applied between the electrodes comprising the reaction chamber to return the piston to its original position. In this case there must also be a means of braking the returning piston so that the kinetic energy of the piston is not turned into heat within the reaction chamber. This can be accomplished by a braking capacitor. After an expansion stroke such as that described herein, the electrostatic force which exists between piston (10) and braking electrode plate (130) at the end of the expansion stroke can then be used to return the piston (10) to its original position, thus preparing it for the beginning of the next cycle. After an expansion stroke, an electrostatic force is applied between braking member (129) attached to piston (10) and braking electrode plate (130). When the kinetic energy of piston (10) is at the desired value, the electrostatic force between piston (10) and housing (20) which acts across the reaction chamber can be removed by allowing charge to flow out the braking capacitor—this allows the braking electrode to absorb the kinetic energy of the piston prior to its complete return. The device is then ready for another cycle as described above.

All components of the devices may be constructed of any suitable materials or combination of materials, including bulk metals, cast metals, plated metals, thin-film metals, bulk glasses, cast and/or mold formed glasses, thin-film glasses, bulk ceramics, cast and/or mold formed ceramics, thin-film ceramics, bulk polymers, mold formed polymers, thin film polymers, crystalline solids, and other materials known in the art. All materials may be further formed into components either by conventional machining or micromachining using microfabrication techniques in a manner that conforms to the tolerance specifications of the device, as known in the art. It is preferred that the piston be substantially nonflexible in the movement direction, although it is not required. The piston may be one piece, or may be formed from different sections. The housing and piston may be constructed of the same or different materials with care paid to coefficient of thermal expansion issues to maintain device specifications. The piston and first and second ends are constructed so that the piston may be energized to move toward the first and second ends. In all devices described herein, appropriate inlets and outlets are assumed to exist. These inlets and outlets may be valve structures as known in the art or described herein.

Electrical or magnetic connection between the piston and first and second ends may be provided by means known in the art, including coating with one or more suitable materials which allows the piston to move toward the first or second ends upon application of a suitable force. Electrodes may be placed or formed on the piston and the first and second ends, which may also be constructed of any material that acts as an electrode. Some portions of the housing may be constructed of different materials than other portions, if desirable or necessary for operation of the device. There may be different electrode geometries on each part. Electrodes may be formed independently and operated independently. If a coating is formed or placed on a section, the coating does not need to be continuous, and for certain methods is preferably discontinuous to facilitate assembly or provide the desired amount of attractive force. Instead of forming the electrodes with a coating, the piston, the first end and the second end or portions thereof, may be constructed of any material capable of being electrostatically energized. Metals or ceramics, which have high magnetic susceptibility, may be used in the case of magnetic actuation, as known in the art. Activation of the piston toward the first or second ends may be provided in a number of ways, for example, applying suitable electrical or magnetic inputs, as known in the art. A control circuit may be used to provide electrical or magnetic control between the piston and said first and second ends.

The device may be constructed of any suitable size to provide the desired amount of cooling over the desired area, as known in the art. The device can provide cooling from room temperature to the liquefaction temperature of the working fluid selected, for example around 4.2 K for the case of helium. The device may be used in series or parallel, as known in the art, to provide additional cooling power and/or a more efficient cooling effect.

Hybrid devices are also provided that use both electrical and magnetic actuation in the same embodiment. In addition to embodiments of the invention having a piston and a first and second end, a piston may have distributed reaction chambers, with more than one chamber on each side of the piston. These chambers may be connected in ways known in the art and described herein.

Figure 3:
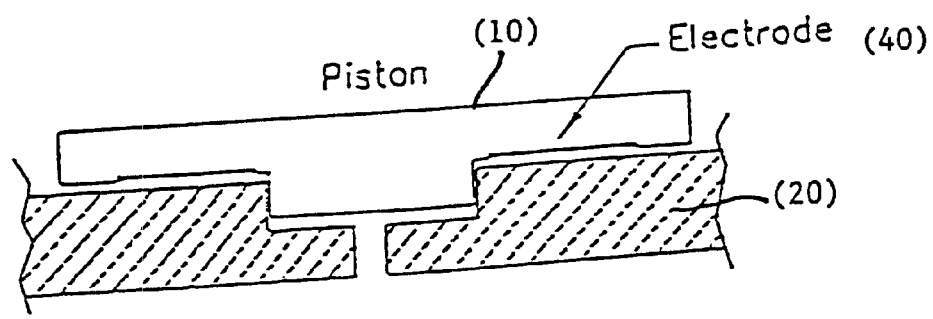
FIG. 3 shows offset piston and force members.

Although the piston is shown as having parallel sides in FIG. 1, the invention includes the configuration shown in FIG. 3, where piston (10) and housing (20) are offset. FIG. 3 shows electrodes (40) recessed in piston (10).

Various thermodynamic cycles may be used, for example the Claude or Brayton cycles as known in the art, to provide the desired thermodynamic change in the working fluid.

The system described may provide cooling at a variety of different levels, such as 250 K or below, 70 K or below, 45 K or below, 35 K or below or 10 K or below and all intermediate values and ranges therein, depending on the design parameters chosen and the working fluid or fluids used. This cooling system does not need to contain any Joule-Thomson valves (valves used for liquefaction of gases, where gases under pressure expand and are adiabatically cooled). If desired, a Joule-Thomson valve may be incorporated to liquefy the working fluid once it is cooled below its inversion temperature, as known in the art.

Any working fluid that provides the desired cooling may be used in the invention. One preferred working fluid is helium. The selected working fluid depends upon the cooling temperature, heat lift, and other requirements of the application. Selection of working fluid is well within the skill of one of ordinary skill in the art, using the parameters discussed herein. In some cases, multiple stages may be connected in series to achieve higher vacuum ratios between the inlet and outlet gas streams or higher compression ratios between the inlet and outlet streams. Multiple stages connected in parallel achieve higher mass flow rates. Also included in the systems described is electrical circuitry to provide activation and control of the force members as known in the art.

Figure 4A:
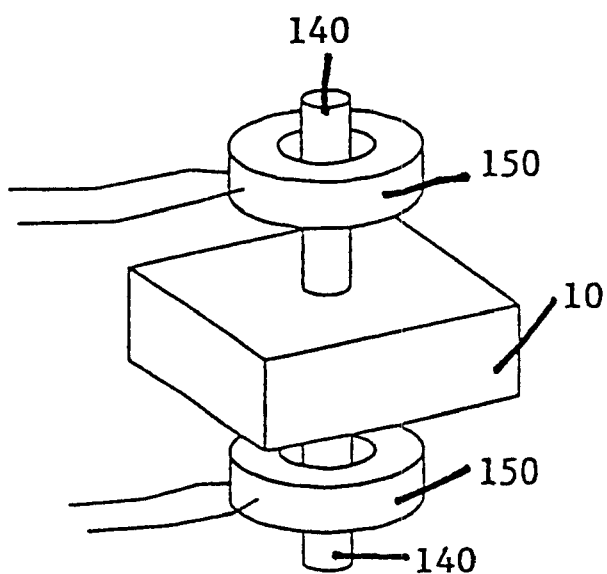
FIGS. 4A and B show the use of magnetic force member
Figure 4B:
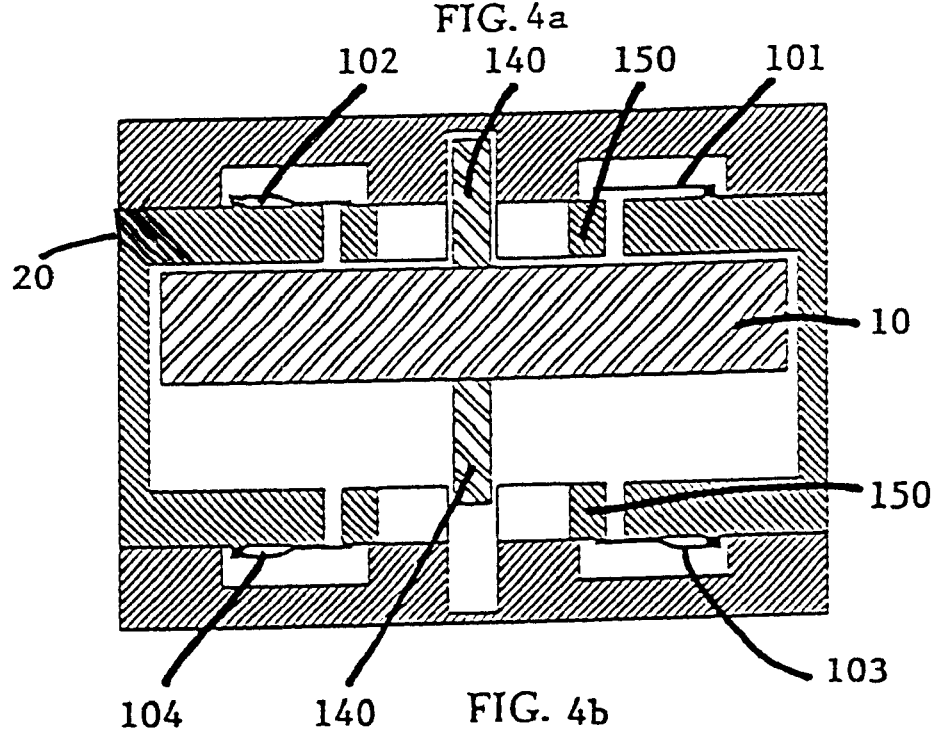
Figure 5A:
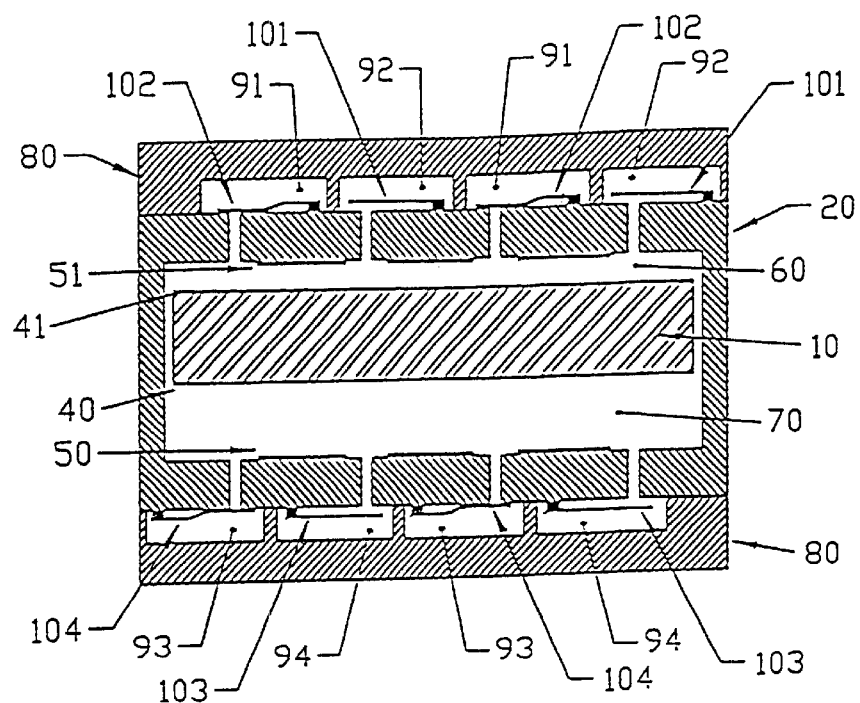
FIGS. 5A through 5D shows system dynamic steps of the expansion engine.
Figure 5B:
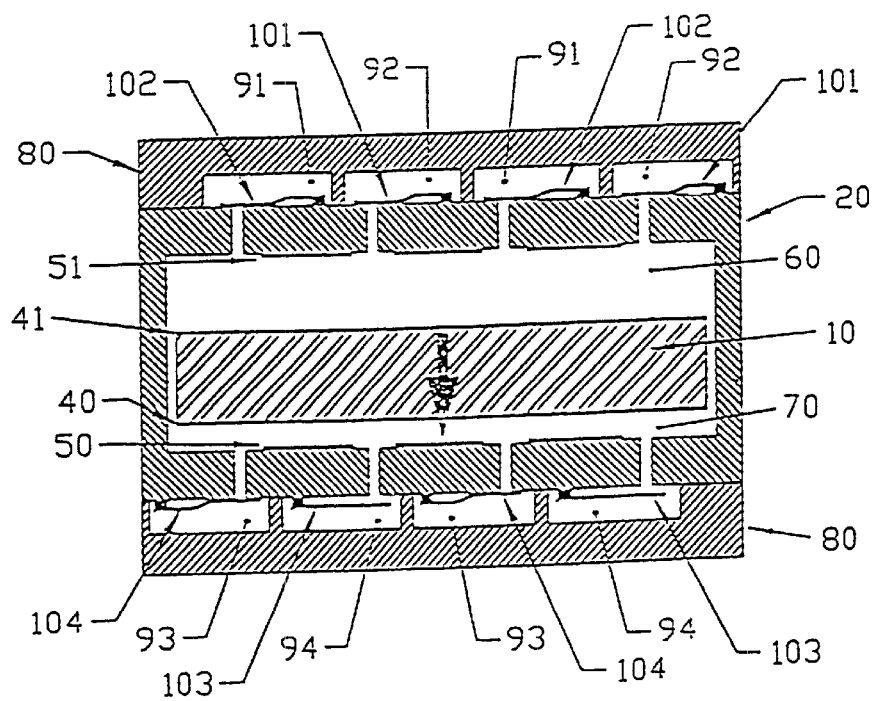
Figure 5C:
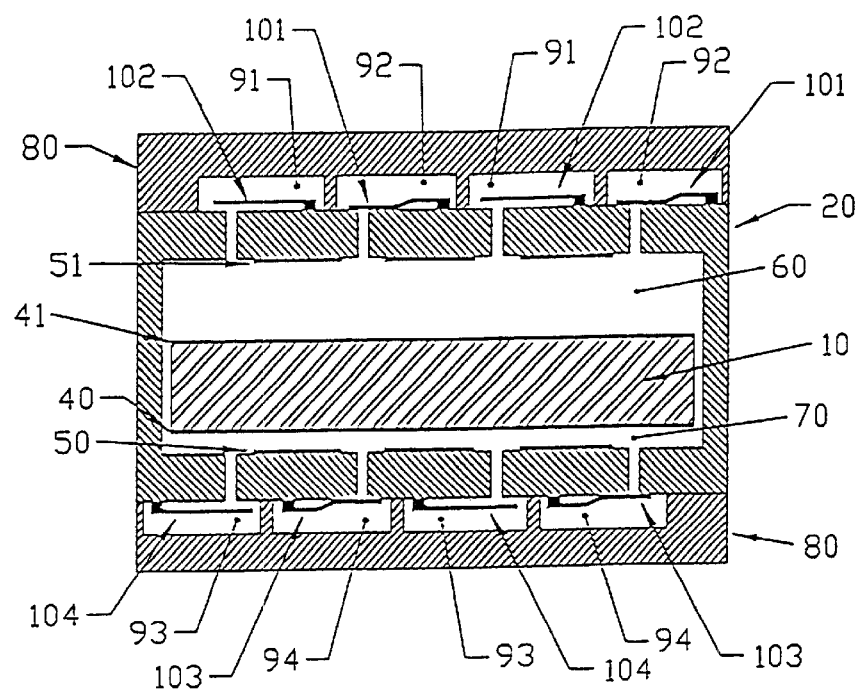
Figure 5D:
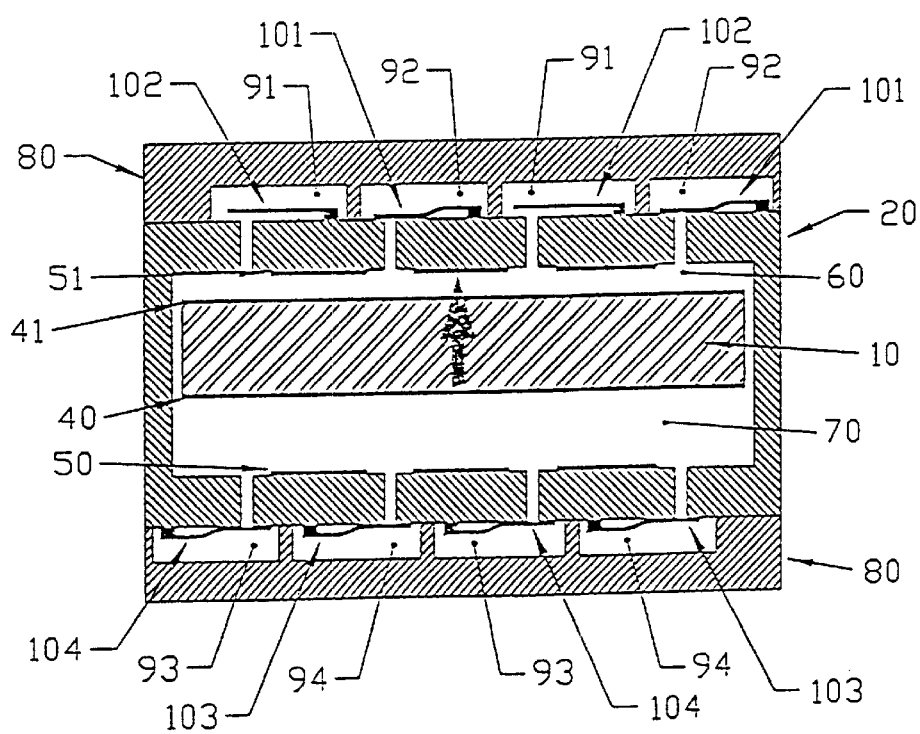

In any case, the capacitor between the piston and the ends may be replaced by a structure such as a rod with a high magnetic susceptibility attached to the piston, which is inserted into a coil formed in the housing. In this case, passing a current through the coil around the rod energizes a magnetic field, which creates a force pulling the rod into the coil as in a standard solenoid. In this configuration, energy is removed from the pressurized gas as it does work pulling the magnetized rod out of the energized coil. This work is converted into electrical energy, which is collected, stored, and distributed to various electrical loads as required by the specific application. A linear electromagnetic motor may also be used where the gas is allowed to do work by moving a suitable magnetic member against the magnetic force established with the electromagnetic member is energized. Other means of magnetic actuation may also be used without substantially changing the intent of this disclosure. An example of magnetic actuation is shown in FIGS. 4A and 4B. FIGS. 4A & B illustrate one instance of a possible method for using a magnetic field, where posts or piston operators (140) on piston (10) are surrounded by magnetically activated members (150) for example, magnetic motors. FIG. 4A shows piston (10) having 2 posts (140) surrounded by magnetically activated members (150). The magnetically operated piston appears in the device in the configuration shown in FIG. 4B, where posts (140) attached to piston (10) and surrounded by magnetically activated members (150) are positioned in housing (20) which contains valves (101, 102, 103, 104) as described herein.

Cooler

For the embodiment of the invention, which operates as an expansion engine used for cooling, the change in thermodynamic state occurs by allowing a gas to do work through expansion by moving the piston against a force. By doing work during the expansion the gas not only has an increased in volume but has an associated decrease in temperature and pressure. The force members may either apply an electrostatic or magnetic force between the piston and the housing, or may apply both electrostatic and magnetic forces.

Conceptually, the expander operates by creating an electrostatic force or magnetic force between two electrodes and allowing pressurized gas to separate the electrodes. Since work is the product of force and distance, the gas does work against the electrostatic force by separating the electrodes; this work is eventually dissipated as heat in a load resistor. By doing work, the entropy of the gas is reduced, and the work provides an efficient means to reduce gas temperature. The expanded low-temperature gas is expelled during the next expansion stroke since the designed expander is double-acting. The expelled gas then moves through the system as described above and provides useful cooling to the applied heat load. If the expansion process is nearly reversible and if the time it takes for the expansion to be completed is short compared to the time it takes for the gas to accept heat from the outside world, then the process will be nearly adiabatic and the overall expansion process may be considered as approximately isentropic. The operation of the device may also be driven by magnetically activated members in an analogous manner to the electrostatically activated embodiments described in detail herein.

In the design of the expansion engine, as in all expansion engines, the expanding gas will do work and in so doing lose energy, reducing both the pressure and the temperature. The design does this work, both by expelling gas from the backside of the piston and by forcing current through an electrical load that is situated remotely from the expansion head. The front side of the piston is defined as the side currently undergoing expansion, and the backside as the side that has previously been expanded and from which gas is being expelled. The operation of the expansion engine can be understood as the transfer of mechanical potential from the gas into an electrical potential. Expressions for energy in the gas are well known from numerous empirical characterizations. A simple expression for electrical energy in the capacitor in terms of plate displacement are easily derived by one of ordinary skill in the art.

Understanding the device depends upon knowing how the energy in the capacitor changes as the plates of the capacitor are forced apart. Clearly, for increasing separation of a charged parallel plate capacitor, where one of the plates is free to move and the plates are initially separated, the potential will increase. If an expanding gas can move the plates of the piston rapidly enough, where rapid is understood to mean faster than the capacitor is discharging to equilibrium, then the gas does work on the capacitor resulting in an increase in the energy stored within the capacitor If the plates are performing mechanical work, the energy stored in the capacitor is decreasing, and if mechanical work is being done by the system, the energy stored in the capacitor is increasing.

An understanding of the dynamic system and the related computational methodology is well known to one of ordinary skill in the art, where it is found that the total current from the device is proportional to the rate at which the plates are being forced apart and is functionally related to the rate at which energy from that gas is flowing into the circuit or the rate that potential from the gas is being transferred to potential in the capacitor, which in turn drives current flow. Also, as the capacitance decreases, the RC time constant also decreases, and the circuit discharges more rapidly. Thus, if the discharge characteristics of a circuit with a dynamically charging capacitance is allowed to dominate the circuit dynamics, the ability of the capacitor to increase the electrical potential is reduced. If the expansion stroke is of short duration compared with the time it takes for heat to be transferred from the reaction chamber, then the process may be approximated as adiabatic. If the work done by the gas on the capacitor is nearly reversible, the process will then be essentially isentropic and an approximate form of $F_{press}$ may be found from the polytropic relation between pressure and volume:

$$F_{press} = P_0 A \left( \frac{Vol_0}{Vol(x(t))} \right)^{1.68}, \quad (A)$$

where $P_0$ is the pressure; $F_{press}$ is force due to pressure; $Vol_0$ is the initial volume before fill; $Vol(x(t))$ is the volume at time t; and A is area where the exponent, 1.68, is the ratio of heat capacity at constant pressure, $c_p$, to the heat capacity at constant volume, $c_v$, for the fluid in question. If helium is used, $$\gamma = \frac{c_p}{c_v} \approx 1.68$$

for temperatures above 10 K. From the force due to pressure, the force between two plates of a moving capacitor can be derived by one of ordinary skill in the art.

The gas related issues such as pressure drop in valve lines, fill times for gas flowing beneath the piston, and the dead volume related efficiency tradeoffs are known in the art and are not discussed in detail here. As derived above, at the beginning of its motion, the electrostatic force between the expander's capacitor electrodes has a quadratic dependence on the relative dielectric constant. For example, since every dielectric material has temperature dependence, temperature changes can dramatically affect the applied voltage required to produce the same force. If the dielectric constant is reduced by 5% as the temperature of the expander drops from room temperature to 70 K, the applied voltage must increase by 5% to maintain the same force. While it might seem that a few percent reduction in the initial force is not worth considering, it will be shown later that each percent reduction can result in an equivalent percent reduction in the overall efficiency of the expander.

Stiction effects arise due to molecular surface interactions and are a function of surface area. Stiction forces on the order of 140 N/cm² have been measured for MEMs-scale contacting surfaces However, a solution to the stiction effect problem is presented by electrodes being separated by thin lands which act as standoffs to keep the electrodes from contacting during clamping. Dielectric breakdown may affect the operation of the device. Methods to minimize the effect of dielectric breakdown are known in the art. The squeeze film effect (as the expander completes its stroke, the gap separating the piston from the valve plate will become very small) may affect the operation of the device and is modeled by methods known in the art.

FIG. 5 shows the device at various stages of operation for the case of an electrostatic force. In this case the expander operates by creating an electrostatic force between two electrodes and allowing pressurized gas to separate the electrodes. Since work is the product of force and distance, the gas does work against the electrostatic force by separating the electrodes; this work is eventually dissipated as heat in a load resistor. By doing work, the internal energy of the gas is reduced; the work provides an efficient means to reduce gas temperature. The expanded low-temperature gas is expelled during the next expansion stroke since the designed expander is double-acting. The expelled gas then moves through the system as described above and provides useful cooling to the applied heat load.

Operation of the device illustrated in FIG. 5. FIG. 5A shows the first step. With valves 102, 103 and 104 closed, gas is admitted by opening inlet valve/s (101) until the desired pressure is attained in reaction chamber (60). When the desired pressure in reaction chamber (60) is attained, exhaust valve/s (103) are opened (FIG. 5B). Inlet valve/s (101) are closed and the electrostatic force between force members 41 and 51 is reduced to allow the piston to move (expanding the gas as nearly reversibly as possible) During pressurization, piston (10) is held in place by the electrostatic force between force members (51) and (41). As piston (10) is moved the gas expands and energy from the gas is transferred into electrostatic energy between the plates. The increased electrostatic potential drives a current through a remotely located load resistor and the expansion work is dissipated as Joule heating. As the piston moves, gas that has been expanded during the previous half-cycle is pushed out through the open exhaust valves (103) and into the exhaust manifold (94). At the same time, the high-pressure gas in reaction chamber (60) is undergoing a reduction in temperature and pressure. After the expansion is complete, exhaust valve/s (103) are closed, piston (10) is energized toward reaction chamber (70) by charging the capacitor structure formed by force members 40 and 50, the opposing inlet valve/s (104) are opened, and the half-cycle is repeated (see FIG. 5C). FIG. 5D shows the device at the start of the next cycle. In this way piston (10) is double acting, expanding and exhausting gas as it moves through each half-cycle. Force members (40, 41, 50 and 51) may be independently controlled such that there can be a delay of any desired length before each half-cycle is initiated. The description for the cooling application in this paragraph will hereafter be referred to as Cycle I.

The expander may be operated in many ways, four of which follow. The first is direct switching of the stationary filled device into a load circuit. The second is a voltage-controlled fill (VCF) whereby filling imparts a velocity to the expander prior to direct switching to the load. The third is a 'hybrid' method of operation, which utilizes active voltage control of the expander's capacitive structure, again to impart an initial velocity prior to switching of the device into a load circuit. The last way directly switches the stationary device into a load circuit that has a load resistor of sufficiently small resistance so that charge quickly leaves the device, which in turn quickly reduces the force. After the piston has attained sufficient velocity, the load resistance can be sufficiently increased so that very little charge leaves the device. In this way both the remainder of the expansion and the produced kinetic energy are converted into electrical potential. The latter method provides a very efficient means of removing the mechanical potential from the gas. It should be clear that many other methods of operation are possible without substantially changing the intent of this disclosure.

Engine

Another embodiment provides operation using a high-pressure/high-temperature gas source and operates as a reciprocating internal combustion engine as shown in FIG. 6. The reciprocating internal combustion engine is comprised of: piston (10); piston housing (20); and metal layers (40, 41) formed on piston (10) and metal layers formed on the piston housing (50 & 51) to provide a capacitor between piston (10) and the piston housing. The engine also includes inlet manifolds (221), (224) and inlet valve structures (211), (214) that isolate the inlet fluid streams and meter the fuel source. There is an ignition structure (200) that initiates the combustion. An exhaust manifold (223), (225) and exhaust valve structures (212), (213) allow for the removal of the combustion products. This embodiment may use exhaust flow to heat the incoming fuel to increase vapor pressure. A pump may also be provided to optionally pressurize the oxidizer and/or fuel prior to admission into the combustion chamber. Fuel and oxidizer storage and plenum volumes may also be provided, as known in the art. Circuitry for the collection, storage, and distribution of generated electrical energy may also be provided, as known in the art.

Figure 6A:
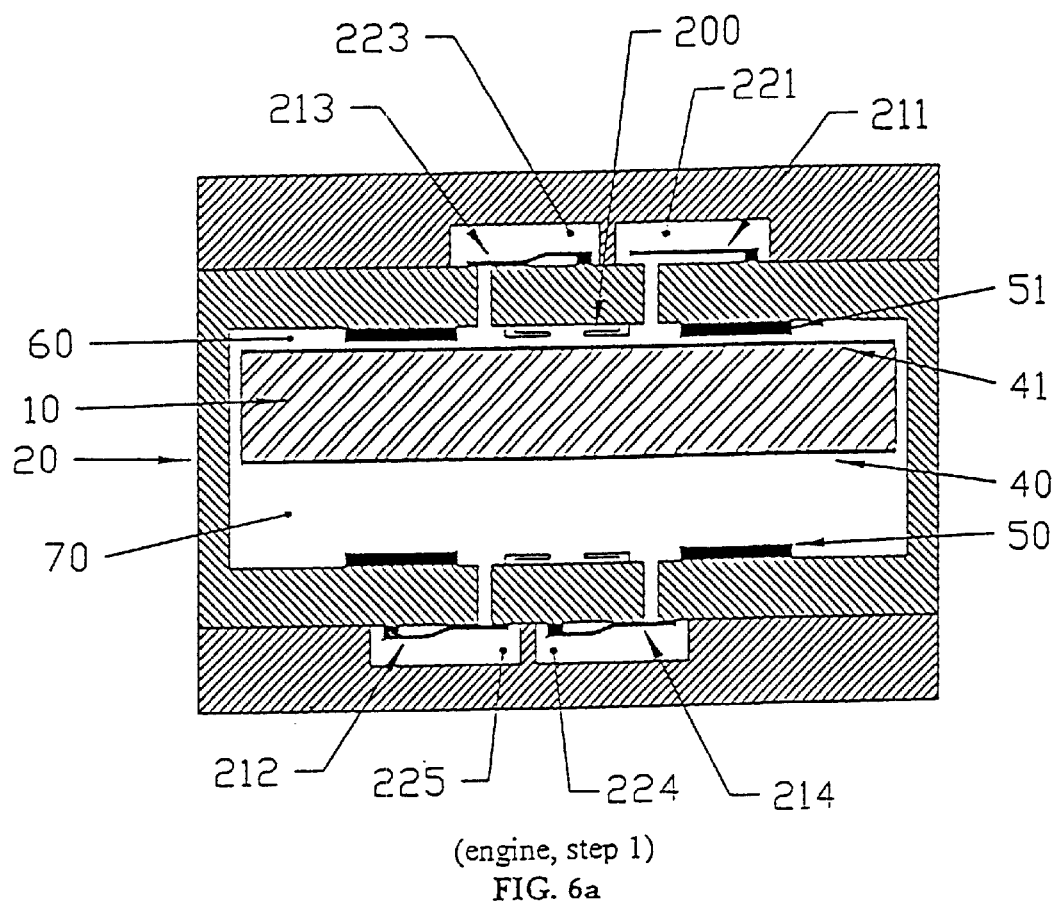
FIGS. 6A through 6D shows the dynamic steps of the heat engine.
Figure 6B:
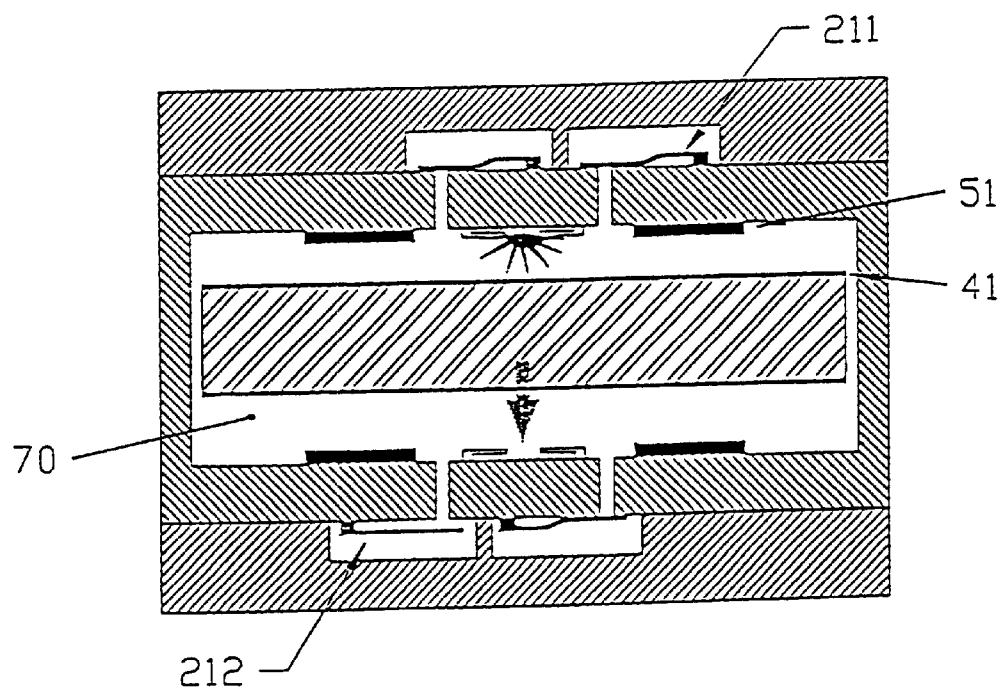
Figure 6C:
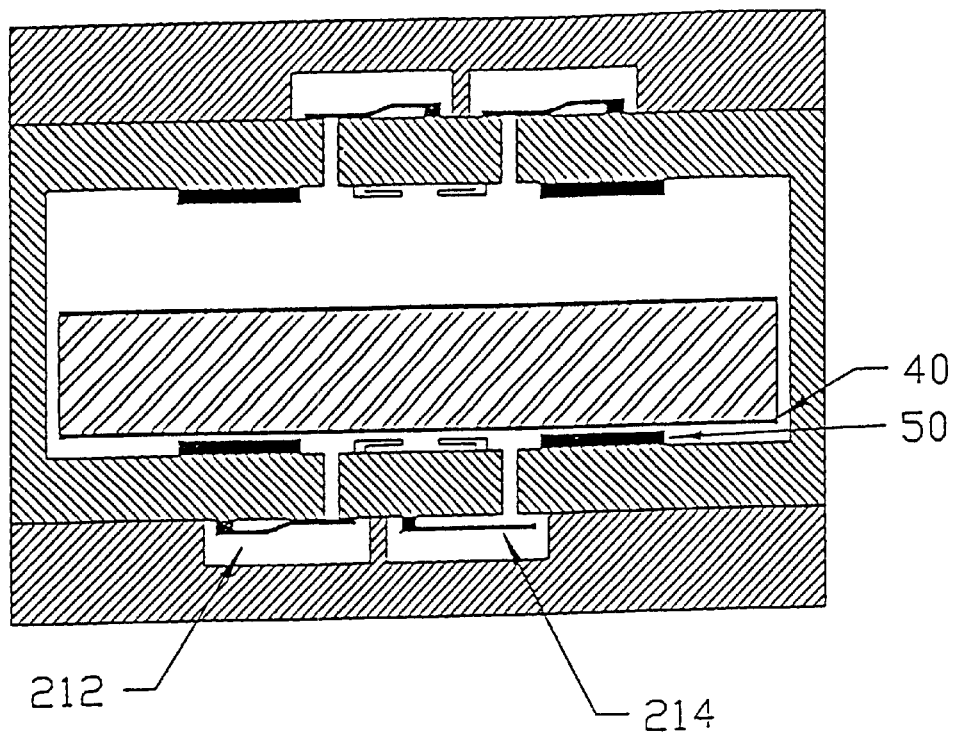
Figure 6D:
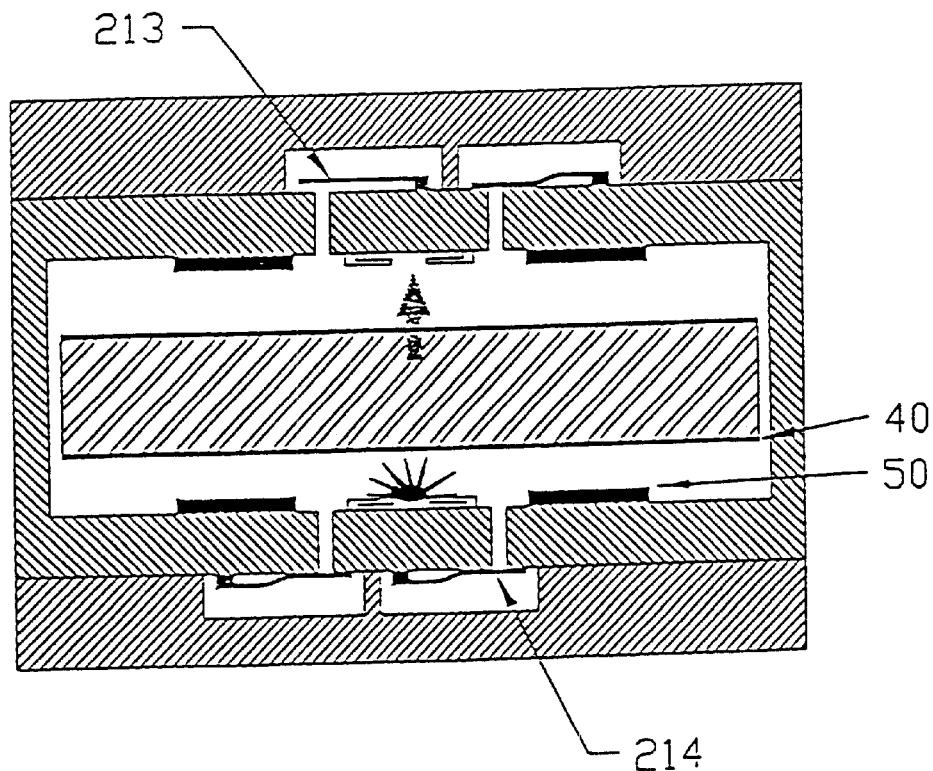

In operation, the admitted fluid will be a combustible mixture and will be ignited with an ignition fixture (200). Or alternately if a high-pressure/high-temperature gas source is available, it could also be used to activate the piston in the same manner as a combustible mixture. For the case of combustion, the combustion mixture is admitted to the chamber through inlet valve (211) (FIG. 6A). After admitting the combustion mixture, inlet valve (211) is closed and piston (10) is energized by increasing the force between force members (41) and (51). The admitted mixture is then ignited and the pressure and temperature of the resulting gas in reaction chamber (60) increases. Energized force members (41 & 51) hold piston (10) in place during combustion. After the combustion process is complete, the circuit that generates the force that holds piston (10) in place during combustion is switched to an electrical load allowing the pressurized products of combustion to expand and do work against force members (41 & 51) (FIG. 6B). The energy from the gas will be transferred directly to the capacitor or the electromagnetic force members; this energy will then be transferred to the electrical load. At the same time that the combustion products in reaction chamber (60) are allowed to expand, exhaust valves (212) are opened and the expanded products of combustion from the previous half-cycle are expelled from reaction chamber (70) (FIG. 6B). In this way the piston is double acting, expelling combusted gases while simultaneously generating electricity with each half-cycle. The next half-cycle is just a repetition of the previously described half-cycle and as before, a temporal delay of any desired length may exist prior to initiating the next half-cycle (FIGS. 6C and 6D). The description for power generation in this paragraph will hereafter be referred to as Cycle II. In this embodiment the combustion chamber may be external to the chamber where expansion takes place, in this case combustion products are admitted through the inlet valves. In the same manner any source of heat that raises the temperature of gas may be used to generate power.

Pumping/compression

For the embodiments of the present invention for pumping fluids and gas compression, FIG. 1 shows the configuration of the device. Work is done on the admitted fluid by applying either a magnetic or an electrostatic force through force members (40 & 50), between piston (10) and housing (20). The inlet valve/s (103) are closed, force members (40 & 50) are actuated, and inlet valve/s (101) on the suction side are opened. The actuation of members (40 & 50) results in a net force between piston (10) and housing (20), reducing the volume of the reaction chamber (60) and commensurately increasing the temperature and pressure of the fluid. After the fluid is at a desired thermodynamic state, exhaust valve/s (103) are opened and the fluid expelled from the reaction chamber with no further changes in the thermodynamic state of the fluid. When a sufficient volume of gas has been expelled, exhaust valve/s (103) and inlet valve (101) are closed, force member (40 & 50) is deenergized, force member (41 & 51) is energized, and the next half-cycle begins. Clearly, such an operational method allows the piston to be double acting —compressing fluid during each half-stroke. As was previously mentioned, a delay of any desired length can precede the initiation of each half-cycle. The description in this paragraph for fluid pumping will hereafter be referred to as Cycle III.

Evacuation

For the embodiment of the present invention used for the evacuation of a fixed volume and/or the production or maintenance of a vacuum, the fluid will be a gas. FIG. 1 again shows the general configuration of the device. This embodiment functions exactly opposite to the aspect that compresses gases. In this embodiment, gas is admitted into the previously evacuated reaction chamber (60) through inlet valve/s (101). After chamber (60) is at the desired volume and pressure, inlet valve/s (101) are closed and exhaust valve/s (103) are opened. Force member (41 & 51) is then energized, causing a decrease in the volume of reaction chamber (60) and an increase in the volume of reaction chamber (70). Since inlet and outlet valve/s (103), (104) are closed, the pressure in reaction chamber (70) is reduced. After all of the gas in reaction chamber (60) is exhausted and the pressure in the fixed volume is sufficiently reduced below the chamber pressure, exhaust valve/s (102) are closed and the first half cycle is complete. At this point, inlet valve/s (104) are opened to the fixed volume and the next half-cycle begins. This in effect lowers the pressure in the fixed volume in a stepwise manner. The piston is clearly double acting, reducing pressure and exhausting gas as it moves through each half-cycle; the change in thermodynamic state is accomplished by allowing the force members to do work on the reaction chambers. Independently controlling the force member controls the timing of the vacuum pumping, so that gas may be admitted and held for any desired amount of time prior to initiating the expulsion. This is useful because prior to expulsion, exhaust valve/s (102 & 103) are opened. The description of evacuation using the present invention in this paragraph will hereafter be referred to as Cycle IV.

Thermodynamics

Figure 7:
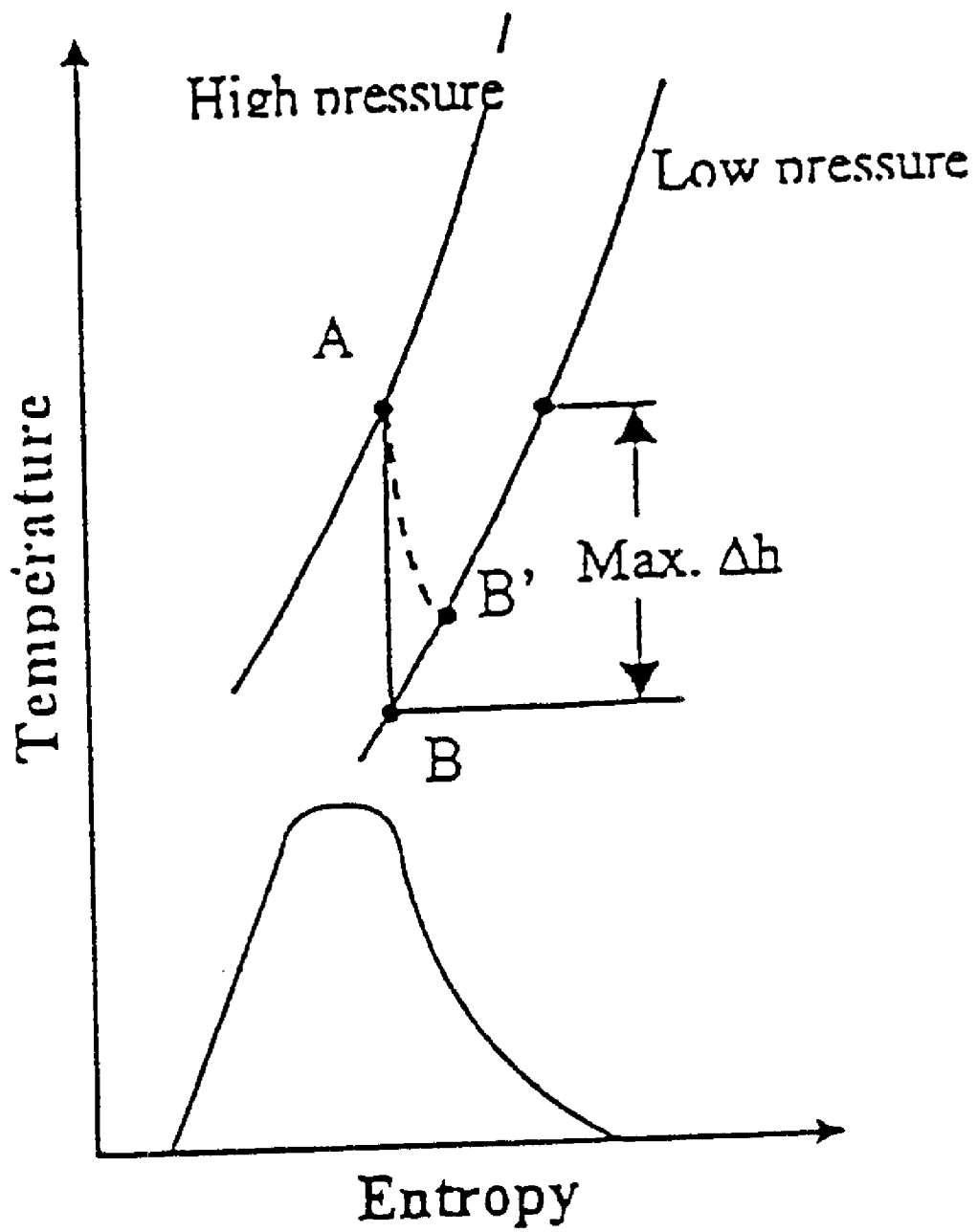
FIG. 7 is a diagram showing the isentropic process.

The operational cycles common to the described aspects of the present invention are based upon a common set of physical principles; thermodynamically the common principle is the use of a thermodynamic processes which is as close to isentropic as is practically possible. For applications where heat is being removed from a gas, a refrigerator, or a heat engine, this represents the most efficient method of energy removal. For systems that add energy to the system, a compressor for example, an isentropic cycle is not the most efficient method of compression, but is the consequence of a rapid compression action. In the case of heat extraction, an isentropic process is not realizable in any real machine because of frictional, heat transfer, and electrical losses. The actual path due to these losses is represented by the dashed line A–B' in FIG. 7. The devices described herein should be designed according to practices well known in the art to minimize these losses, enabling the construction of cryocoolers with significantly higher efficiencies than present cryocoolers, especially at lower temperatures.

One of the preferred physical principles is that the slidably disposed piston does not make direct contact with the side walls of the housing. This is accomplished, in one example, by the use of linear flexure bearings, which align and maintain orientation (see FIG. 1B). Also included in the common set of physical principles are the various means for generating a force between the piston and the housing. The dynamics of this system are found by describing the interaction between this generated force and the reaction force of the fluid being acted upon. When the piston and housing are coupled through the force members, a set of differential equations governs the motion of the piston as its position changes with respect to that of the housing. For example, when using electrostatic force members to accomplish the change of thermodynamic state described in Cycle I, the gas converts internal energy directly into an electrical potential. This occurs by separating positive and negative charge and performing work as the attractive forces between these charges are overcome. The charge is established by connecting one side of an electrical potential to the metal layer intimately formed as part of the piston and the other side of the electrical potential to an opposing metal layer intimately formed as part of the housing. Metal layers and are commonly referred to as the "plates" of a capacitor structure and this term will be used hereafter. At the beginning of the first half-cycle, the plates of the capacitor are separated by a dielectric layer with some dielectric constant $\in = \in_r \in_0$, where $\in_r$ is the commonly understood unitless quantity called the relative dielectric constant and $\in_0$ is the permittivity of free space $8.85 \times 10^{-12}$ F/m. The dielectric layer is included to prevent electrical discharge between the plates of the capacitor. The charge on the capacitor follows the well-known charges according to the well-known formula $$Q = CV, \qquad 1$$

where,

Q is the charge between the plates of the capacitor

V is the voltage between the two metal layers comprising the electrostatic force member C is the capacitance defined as $$C = \frac{A\varepsilon_{\mathit{eff}}}{(H_0 + x(t))}, \qquad 2$$

where,

A is the area of the metal layers, $\in_{\mathit{eff}}$ is the effective dielectric constant. $\in^{\mathit{eff}}$ is defined as $$\varepsilon_{\mathit{eff}} = \frac{\varepsilon_r \varepsilon_0 (H_0 + x(t))}{(H_0 + \varepsilon_r x(t))}, \qquad 3$$

where, $H_0$ is the thickness of a possible dielectric layer, and x(t) is the possibly time-dependent distance defined as the total separation of the metal plates less $H_0$.

Some time after the electrical potential V is applied to the plates of the capacitor, usually expressed in terms of a multiple of RC time constants, a certain amount of charge Q and a certain amount of energy $U_C$ have been stored in the capacitive structure. The value of $U_C$ is given by, $$U_C = \frac{Q^2}{2C}, \qquad 4$$

with variables as defined above. Equations 1–4 make it clear that if, after charging the capacitor the separation between the plates of the capacitor changes, the energy will change commensurately. In fact, if after energizing the capacitor, no charge can flow from the device, the change in energy as the plates move apart is:

$$\Delta U_C = U_{C_f} - U_{C_i} = \frac{Q_0^2}{2A\varepsilon_0}(x_f - x_i), \qquad 5$$

where, $U_{C_f}$ is the final energy stored in the capacitor after the piston has finished moving, $U_{C_i}$ is the initial energy stored in the capacitor before the piston has started moving, $X_f$ is the final position of the piston, $x_i$ is the initial position of the piston, $Q_0$ is the initial charge stored in the capacitor, and all other values are as previously defined.

Equation 5 does not represent the electrical characteristics of a functional expansion engine since there will always be charge flow out of the device; however, Equations 1 and 5 clearly point out that if the charge on the plates of the capacitor is moved from equilibrium, then the energy stored in the capacitor increases. If the expanding gas moves the plates of the piston faster than the capacitor can discharge, the gas does work on the capacitor and the potential energy in the capacitor increases. The increased energy is part of the energy the gas has lost due to expanding the volume of the chamber. Another portion of the energy the gas has lost is found in the kinetic energy resulting from the motion of the piston. For the system where the filled device is directly switched into a load circuit, ignoring heat transfer from the gas, energy conservation states that at any time t:

$$U_C(t) + U_R(t) + U_{KE}(t) + U_G(t) = U_{G0} + U_{C0} \qquad 6$$

where, $U_C(t)$ is the energy stored in the capacitor at time t, $U_R(t)$ is the cumulative energy dissipated across the resistor, integrated from t=0 to t, $U_G(t)$ is the energy stored in the gas at time t, and is referenced to the final energy in the gas, and implicitly contains the change in enthalpy due to PV work done by pushing out the previously expanded gas.

$U_{G0}$ is the energy initially stored in the gas. $U_{G0}$, as referenced to the final energy in the gas, can be found from the initial temperature, pressure, and quantity of the gas and the final pressure by methods well known to those skilled in the art; for example, refer to Robert McCarty, "Thermodynamic Properties of Helium 4 from 2 to 1500 K at Pressures to $10^8$ Pa", Journal of Physical and Chemical Reference Data, Vol. 2, No. 4, pp. 923–1042, 1973.

$U_{KE}(t)$ is the kinetic energy stored in the moving piston at time t, and represents an operational inefficiency, because any kinetic energy remaining in the piston after the stroke is completed will be absorbed as heat when the piston stops. The amount of reheating from reabsorbed kinetic energy must be controlled if an expansion engine capable of efficient cooling is to be fabricated. The ideal expansion engine is one that satisfies the relation $$\int_0^{t_f} U_R(t)\,dt = U_{C0} + U_{G0}. \qquad 7$$

$U_{C0}$ is the energy initially stored in the capacitor and this is defined as $U_{C0} \geq P\,A\,d$ where, P is the net pressure acting across the face of the piston,
A is the area over which the pressure initially acts, and
d is the spacing between the metal layers that defines the capacitor structure (typically $H_0$).

The energy $U_{C0}$ is the result of applying an electrostatic force between the piston and the housing during pressurization of the reaction chamber. The applied force holds the position of the piston fixed during pressurization and gives operational control over the exact time that an expansion half-cycle will be initiated. The value of the energy stored in $U_{C0}$ represents an operational inefficiency, since after discharge this energy will have been discarded. Unlike inefficiencies found in traditional reciprocating expanders, which arise for reasons such as open inlet valves during expansion, this loss does not affect the expander efficiency, rather affecting the Carnot efficiency.

In reality, Eq. 7 can never be satisfied due to parasitic losses such as heat transfer from the gas, but this does provide the metric for the system:

$$\eta = \frac{\int_0^{t_f} U_R(t)\,dt}{U_{C0} + U_{G0}}, \qquad 8$$

and indicates the values to maximized. For example, $$\int_0^{t_f} U_R(t)\,dt$$

should be maximized to ensure the most complete conversion of energy in the gas. This type of optimization depends intimately on the exact nature of the detailed implementation; e.g., choice of materials, operating voltages, gas flow conditions, maximum current flows, and mass flow requirements. This type of optimization is well known to those skilled in the art of electrical and mechanical device design.

While providing a useful guide to design, energy considerations do not provide a method for determining or controlling the dynamics of the present invention. For example, as defined above, $U_{C0}$ can be reduced by reducing either P or d. However, P will typically be fixed by the thermodynamic requirements of the application, so that the only variable that can practically be changed is d. On the other hand, d is part of a larger set of dynamic relations that determine the detailed operation of any aspect of the present invention.

Considering the example of an expansion engine with electrostatic drive, the dynamics of the system are defined by the discharge characteristics of a capacitor with plates that can move. This occurs when the pressure force between the plates of the capacitor is greater than the electrostatic force between the plates of the capacitor. It can be shown that the defining equations for the dynamical system are:

$$i(t) = \frac{dQ(t)}{dt}, \qquad 9$$

$$F = m\frac{d^2 x(t)}{dt^2} = F_{Press} - F_{Cap}, \qquad 10$$

where, m is the mass, $F_{Cap}(x(t))$ is the force on the plates of the capacitor and can be found by methods well known to those skilled in the art of mechanical and electronic device analysis. For this example, the force on the plates of the capacitor may be written as shown in Eq. 10, $F_{Press}$ is the pressure force as a function of piston position and, as stated before, may be found using methods well known to those skilled in the art, and all other variables are as previously defined.

Since the capacitive force depends on Q(t), equations 9 and 10 are coupled. These equations may be solved by a variety of numerical techniques well known by those skilled in the art. The solution of these equations in a manner consistent with the energy considerations described above allows the present invention to effectively operate as an expansion engine with extremely high efficiencies. Examples of this operation are disclosed in the preferred embodiments.

The exemplified expansion engine with capacitive and/or magnetic force members may be operated with any number of modifications to the most basic implementation presented here. For example, multiple and independently operated electrostatic or electromagnetic force members as shown in FIG. 5, may be employed. A wide variety of active and passive circuit elements such as transistors, operational amplifiers, voltage converters, diodes, inductors, resistors, capacitors, and many other electronic circuit elements may be used to modify the electrical characteristics of the device, as known to one of ordinary skill in the art. An example of an active device described with active voltage control of the electrostatic force between the plates of the capacitor. It should be clear that a plurality of circuit modifications could be implemented without fundamentally affecting the operation of the disclosed invention.

For the specific example of the expansion engine, we note that while circuit modifications leave the general operation of the device unchanged, the detailed energy balance and dynamics as described by Eqs. 9, and 10 can be significantly changed. Such modifications are well known by one of ordinary skill in the art.

In the case of active voltage control, the voltage source acts as both an energy source and an energy sink by providing current as required. This greatly modifies Eq. 6. Also, a dynamic model for this case must account for changes in the current/voltage relationship. These changes may be analyzed using detailed circuit analysis methods such as SPICE simulation techniques well known to those skilled in the art. Such a simulation can be used to accurately describe the interaction between the power supply and the capacitor, and when solved, allow for the control of kinetic energy to maximize the efficiency of energy transfer from the gas to the load presented by the power supply. Such circuits significantly change Equations 9 and 10 since current will flow into and out the power supply in accordance with a lumped parametric model. The capacitive force relation becomes, $$F_{Cap} = \frac{A\varepsilon_0\varepsilon_r}{(H_0 + x(t))(H_0 + \varepsilon_r x(t))} \frac{V^2}{2}, \quad 11$$

where variables are as previously defined. As described herein, when using the active voltage control mode of operation, the velocity of the piston may be fixed at some desired value by using a voltage with a desired functional form. Energy transfer for this case may be calculated directly.

Operation of the present invention as an expansion engine may also be accomplished using a magnetic force member as illustrated in FIG. 4. In this case the governing Equations 9 and 10 will be modified to reflect changes in energy storage, changes in electronic circuitry, and changes in method of applying the force that opposes the expansion force presented by the gas. In this case Equation 10 becomes Equation 12

$$F = m\frac{d^2 x(t)}{dt^2} = F_{Press} - F_{Mag} \quad 12$$

where, $F_{Mag}$ is the magnetic force applied by an electromagnetic source acting on some member, which possesses sufficient magnetic force.

$F_{Mag}$ can be determined in ways familiar to those skilled in the art. For examples, refer to M. Piron et al., "Rapid Computer Aided Design Method for Fast-Acting Solenoid Actuators", M. F. Rahman, et al., "Position Estimation in Soleniod Actuators", and K. Y. Yuan et al., "A New Algorithm for Coupled Solutions of Electric, Magnetic, and Mechanical Systems in Dynamic Simulation of Solenoid Actuators". The variable reluctance arrangement of FIGS. 4a and 4b also allows for the fabrication of an expansion engine with very high thermodynamic efficiencies and is described in the preferred embodiments. Similar thermodynamic analysis, to that described herein, can be performed for other methods of operating the device, as known to one of ordinary skill in the art.

In the aspect of the present invention pertaining to the expansion of a compressed fluid, common physical principles analogous to those described by equations 1–12 govern cycle detail II and can easily be determined by those skilled in the art. Clearly the most efficient operation of this system found by:

1) Minimizing $U_{C0}$ or $U_{M0}$, which in turn means metering a volume of combustion products sufficient for the generation requirements but no greater,
2) Minimizing heat leak transfer into the cold gas from the reaction chamber and into the warm gas lines that lead from the expander into the final heat exchanger,
3) Minimizing the operating voltage since this will lead to increased parasitic power losses. This also implies the practical minimization of the gap between the plates of the capacitor and/or increasing the number of turns in the coil that provides an electromagnetic force. This also means choosing the smallest practical surface area for the compressed fluid to act on versus electrode area and/or magnetic circuit size. This may also entail the use of three-dimensional surface features, exemplified in the preferred embodiments, so that the pressure force can abruptly change the reaction area,
4) Minimizing resistance in the connections to the force members and connection to the force members, thus reducing parasitic losses and reheating due to Joule heating affects,
5) Minimizing leakage through the valve structures, and
6) Optimizing the electrical and dynamical characteristics of the device, according to the methods analogous to those described herein and those methods well known to those skilled in the art, so that maximum amount of energy is transferred to the gas.

In the energy generation aspect of the present invention, common physical principles analogous to those described by equations 1–12 govern Cycle II and can easily be determined by those skilled in the art. Clearly, the maximum amount of energy can be converted into electrical energy in this system by:

1) Minimizing either the initial capacitance or the initial magnetic force, which in turn means metering the volume of combustion products so that it is sufficient for the generation requirements but no greater.
2) Ensuring complete combustion, either by pressurization and/or preheating of the combustion mixture. This can be accomplished either with a compressor or by using a heat transfer mechanism, which allows for the transfer of residual energy from the previous combustion products into the unreacted fuel/oxidizer mixture. Combustion may also be enhanced through the choice of appropriate combustion mixtures and suitable ignition fixtures,
3) Minimizing resistance in the connections to the force members, thus reducing parasitic losses,
4) Minimizing leakage through the valve structures, and
5) Optimizing the electrical and dynamical characteristics of the device, according to methods analogous to those described herein and in ways well known to those skilled in the art, so that maximum amount of energy is transferred to the electrical circuit and the minimum practical amount remains in the expanded gas.

In the aspect of the present invention pertaining to the pumping of or compressing fluids, common physical principles analogous to those described by equations 1–12 govern Cycle III and can easily be determined by those skilled in the art. In the case of compressing a gas, clearly the most efficient operation of this system found by:

1) Minimizing the increase of the fluid temperature at each stage. This in turn implies the use of as many stages as practical.
2) Minimizing the operating voltage since this will lead to increased parasitic power losses. This also implies the use of as many stages as practical for compressing gases and also implies the practical minimization of the gap between the plates of the capacitor and/or increasing the number of turns in the coil that provides an electromagnetic force. This can also mean choosing the smallest practical surface area for the compressed fluid to act on versus electrode area and/or magnetic circuit size. This can also entail the over pressurization of a small volume of the fluid. This over pressurized fluid can be used to store energy when the plates of the capacitor are closely spaced near the end of the compression stroke and can be retrieved at the beginning of the next compression stroke when the plates of that capacitor are far apart.

3) Minimizing resistance in the connections to the force members, thus reducing parasitic losses.

4) Minimizing leakage through the valve structures.

5) Optimizing the electrical and dynamical characteristics of the device, according to the methods analogous to those described herein and in ways well known to those skilled in the art, so that maximum amount of energy is transferred to the gas.

In the aspect of the present invention pertaining to the production of a vacuum, common physical principles analogous to those described by equations 1–12 govern Cycle IV and can easily be determined by those skilled in the art. Clearly, the most efficient operation of this system found by:

1) Minimizing the operating voltage since this will lead to increased parasitic power losses. This implies the use of as many stages as practical and also implies the practical minimization of the gap between the plates of the capacitor and/or increasing the number of turns in the coil that provides an electromagnetic force. This also means choosing the smallest practical surface area for the high-pressure fluid to act on versus electrode area and/or magnetic circuit size.

2) Minimizing resistance in the connections to the force members, thus reducing parasitic losses.

3) Minimizing leakage through the valve structures.

4) Optimizing the electrical and dynamical characteristics of the device, according to the methods analogous to those described herein and in ways well known to those skilled in the art, so that maximum amount of energy is transferred to the gas.

Cooling Systems

Figure 8A:
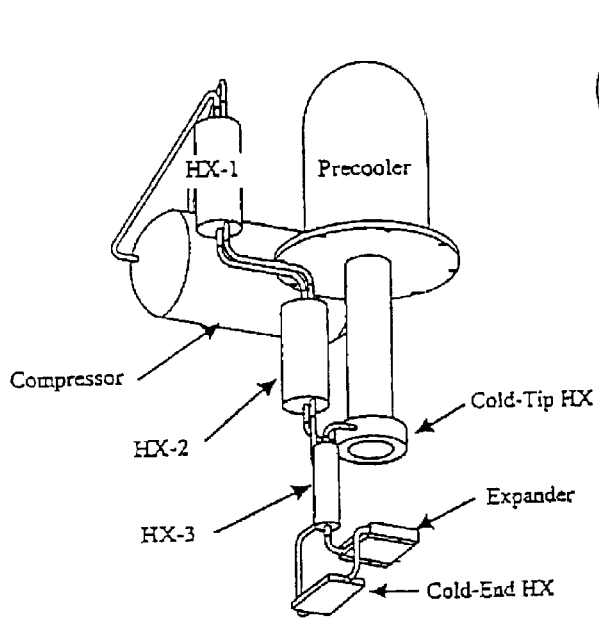
FIGS. 8A and 8B are one application using an expansion engine.
Figure 8B:
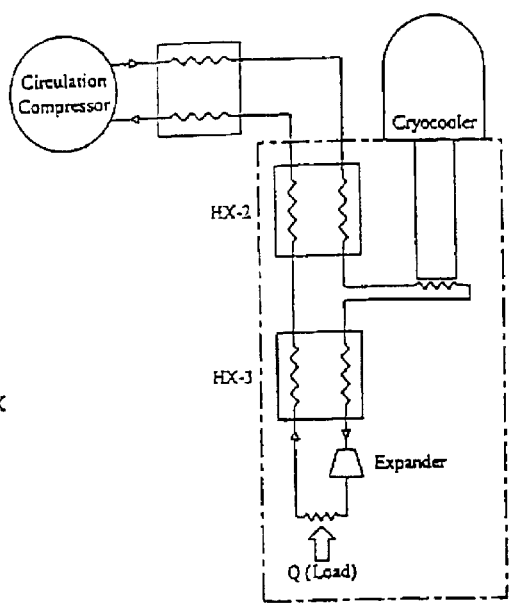

The devices of the invention may use various other components than those described above to form a complete cooling system. Connection of these components is known to one of ordinary skill in the art. See FIG. 8, for example. As shown in FIG. 8, a compressor provides the gas to be expanded. An exhaust manifold and valve structure exhaust the expanded gas. If the expansion engine is to be used as a cryocooler, it may also have a precooler that cools the incoming gas; this may be another expansion engine. A means is provided for removing heat from the incoming gas by using part of the cold gas stream produced during expansion; this means of heat removal is commonly referred to as a heat exchanger. A final heat exchanger is provided to allow the cold gas to cool a remote object. Circuitry provides activation and control of the expander force members that can be either electrostatically and/or electromagnetically actuated.

In a preferred embodiment of the cooling system, there are six major components: 1) helium circulation compressor, 2) precooler, 3) heat exchangers (HX), 4) expander, 5) cold end heat exchanger, and 6) control electronics. These are shown in FIG. 8.

The helium circulation compressor may be a commercial unit that provides the required helium flow rate and pressure characteristics or other suitable compressor. One example of a suitable compressor is an oil-less piston compressor manufactured by Thomas Compressors & Vacuum Pumps, model 688CE44, capable of providing in excess of 1 ft$^3$ flow rate at a 3:1 pressure ratio. The precooler may be a tactical type Split-Stirling Cycle cryocooler manufactured by DRS Technology, model number 3056786-7 or other suitable precooler. This cryocooler has a nominal heat lift capability of 1 W at 80 K. The three recuperative heat exchangers may be the compact, lightweight, high-effectiveness, parallel-plate heat exchangers of the configuration developed at the National Institute of Standards and Technology (NIST). The cold tip heat exchanger may consist of small diameter tube wrapped around a bobbin and attached to the precooler cold tip, or other suitable exchangers or other suitable heat exchanger. The cold end heat exchanger can be either a tubular or plate-and-fin configuration that is designed to be compatible with the focal plane array (FPA) cooling interface.

Figure 9A:
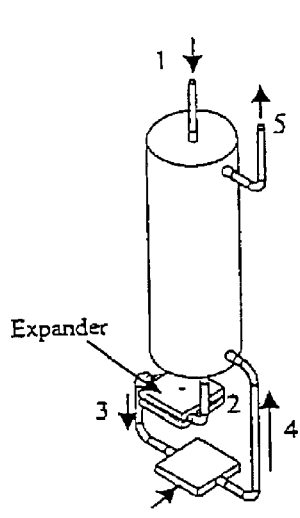
FIG. 9A shows an example cooling system.
Figure 9B:
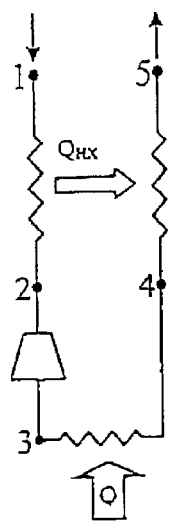
FIGS. 9B and 9C show the state change through the example cooling system.
Figure 9C:
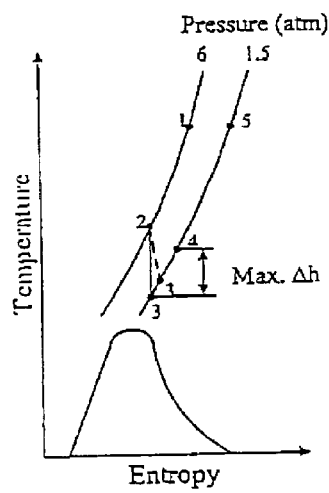

The cold end assembly consists of a heat exchanger, an expander, and a cold end heat exchanger. The thermodynamics of the process are described in FIGS. 9A–9C. Cold helium gas from the precooler enters a heat exchanger (HX-3 from FIG. 8) (described at Point 1 on FIG. 9A), where the return gas stream from the cold end heat exchanger further reduces the temperature to the desired value before it enters the expander assembly (Point 2 on FIG. 9A) and is expanded nearly isentropically to its final low temperature (Points 2–3 on FIG. 9A) (in this example, from 3.0 to 1.2 atm). The cold helium exits the expander assembly and is routed to the cold end heat exchanger where it absorbs heat from the focal plane array (FPA) (Points 3–4 on FIG. 9A) increasing its temperature. It returns to the low-pressure side of a heat exchanger (HX-3 from FIG. 8), where it cools the helium stream from the precooler. Upon exiting the heat exchanger (HX-3 from FIG. 8) (Point 5 on FIG. 9A), the helium stream returns to another heat exchanger (HX-2 from FIG. 8), where it cools the helium stream from heat exchanger (HX-1 from FIG. 8). FIGS. 9A–9C show this process diagrammatically, schematically, and thermodynamically, respectively.

The control electronics provide the braking force for the expander, absorbing energy from the gas and dissipating it as Joule heating; it also adjusts the compressor and expander speeds to provide constant temperature cooling in response to variable heat loads.

In a Joule-Thomson (J-T) process, no energy is removed from the gas, severely limiting its efficiency. However, expanding a gas through an expansion engine approaches an ideal isentropic process that actually removes energy from the gas stream, producing many times the cooling power of a J-T system. For example, expanding helium from 6 to 1.5 atm using a J-T cold-stage with a precooler temperature of 15 K results in a maximum specific cooling capacity of 4 J/g. In contrast, if the helium is expanded isentropically from 6 atm at 15 K to 1.5 atm, the enthalpy change is 31.4 J/g, nearly eight times the cooling capability of the J-T process. Since the expansion is isentropic, the working fluid does not have to be below the J-T inversion temperature. For 10 K cooling using a J-T cold end, the precooler must be approximately 15 K; using an expansion engine, the precooler temperature can be as high as 70 K. Operating a cryocooler at 70 K is much more efficient than operating it at 15 K. The minimum input power (i.e. 100% Carnot efficiency) to remove 1 watt at 15 K is 19 W/W; at 70 K, it is 3.28 W/W, almost six times less input power. When realistic cryocooler efficiencies are used, the relative difference in input power is much greater, approximately 20:1 !

Optimization of the overall cooling system is performed using the inlet pressure, pressure radio, and precooler temperature as independent variables. The helium mass flow rate necessary to meet the heat lift requirements is determined. From this information, the heat exchangers are sized, the precooler heat lift determined, and all the parameters for the design and analysis of the expander defined. Two examples, 1-W heat lift at 35 K and 250 mW at 10K are given to illustrate the systems analysis and show the high efficiency potential of the ELTC concept. In both examples, the inlet and outlet pressures are set at 6 and 1.5 atmospheres, respectively.

Figure 9D:
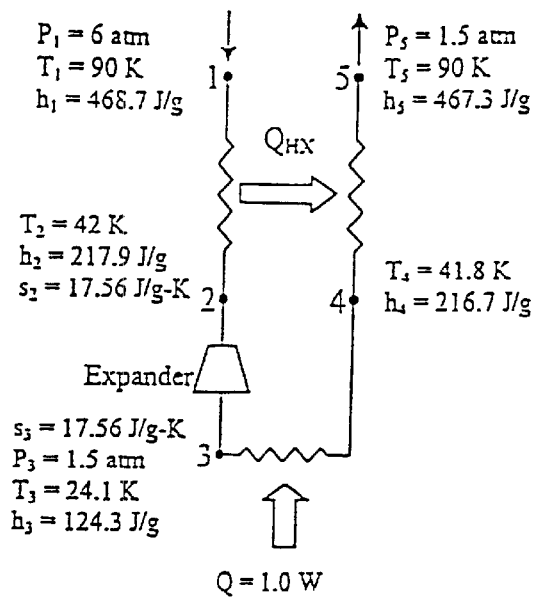
FIG. 9D shows an example analysis for a 35K expander.

FIG. 9D shows the cold-end schematic for the 35 K cooling case with a precooler temperature of 90 K. To achieve an average cooling temperature of 35 K, the heat exchanger exit temperature ($T_2$) must be about 42 K. Assuming a 100% effective heat exchanger and expander, the thermodynamic state of the helium at each location throughout the cycle was determined. The maximum specific energy available for absorbing the heat load is $(h_4-h_3)=92.4$ J/g. Thus, the minimum helium flow rate is:

$$m = Q/\Delta h = \frac{1.0 \text{ J/s}}{92.4 \text{ J/g}} = 10.8 \text{ mg/s}.$$

For a 60% efficient expander and heat exchanger effectiveness of 0.99, the specific energy available to absorb heat is 53.6 J/g, and the corresponding helium flow rate is 19 mg/s. The amount of energy removed from the helium in HX-3 to reduce its temperature to 42 K is 4.67 watts:

$$Q_{HX}=m(h_1-h_2)=4.67 W.$$

This quantity of heat can easily be transferred with a relatively small tube-in-tube heat exchanger.

Using a 0.98 effectiveness of HX-2, the precooler heat lift is 0.37 W at 90 K. For a cryocooler efficiency of 10W/W and using standard cryocooler drive electronics, the precooler input power is 17.1 W. If the circulation compressor is 60% efficient, the total system input power is 54 W, a Carnot efficiency of 14%!

A similar analysis for a heat lift of 250 mW at 10K is illustrated by FIG. 9C. The helium flow rate for a 60% efficient expander and 0.99 effective heat exchanger is 25 mg/s. The heat exchanger capacity is 7.9 W and the precooler heat lift is 520 mW at 70 K. Using a cryocooler efficiency of 20 W/W and the same values for cryocooler drive electronics and circulation compressor efficiencies, the total input power is 73 W, yielding a Carnot efficiency of 10%.

Figure 9E:
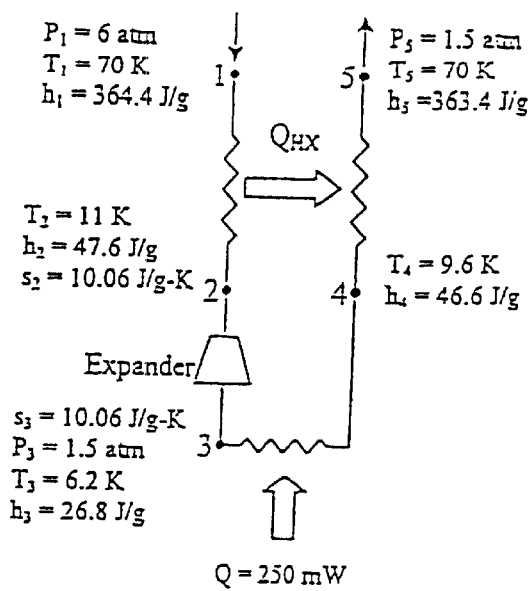
FIG. 9E shows an example analysis for a 10K expander.

The examples shown in FIGS. 9D and 9E may be altered by choice of thermodynamic cycle, desired starting and final temperatures, and acceptable amount of heat loss, for example as known in the art, to design the appropriate device.

Some sources of system inefficiencies that impact the bottom line specific power capabilities of the system include: 1) heat leak into the system from the warm environment, 2) system pressure losses, and 3) expander inefficiency. The use of a precooler can reduce system heat leak effects and provide low-temperature shielding of the cold assembly. System pressure losses are primarily associated with achieving high effectiveness in the recuperative heat exchangers. These losses are readily calculated in the sizing of individual heat exchangers and accounted for in the thermodynamic model. Thermodynamic, mechanical, and electrical inefficiencies in the expander increase the final temperature and decrease the specific cooling power.

One embodiment of the precooler cold tip heat exchanger is a length of small diameter tubing that is thermally attached to the cryocooler cold tip. If the inlet and outlet temperatures are $T_i=107.6$ K and $T_0=105$ K; at 3.05 atm pressure, the average fluid properties are:

Density ($\rho$)=1.39 g/l
Viscosity ($\mu$)=1.01×10$^{-4}$ g/cm-s
Thermal conductivity (k)=7.7×10$^{-4}$ W/cm-K
Specific heat ($C_p$)=5.20 J/g-K The amount of heat that must be transferred to the precooler cold tip is:

$$Q_{CT}=mc_p(T_1-T_0)=1.06 \text{ W}$$

For a stock tubing with a 0.082-in. inside diameter and a 0.009-in. wall thickness, the Reynolds number is 4730; thus, the flow is in the critical zone between laminar and turbulent. Using a conservative assumption of laminar flow and constant wall temperature, the heat transfer coefficient is h=0.014 W/cm$^2$-K. Assuming a precooler cold tip temperature of 103 K and a tube wall temperature of 104 K, the $\Delta T_{1m}$ is 2.03 K. From the relationship $Q_{CT}=hA\Delta T_{1m}$, the length of tube required to transfer 0.73 W is:

$$L=Q_{CT}/(\pi Dh\Delta T_{1m})=57 \text{ cm, a heat exchanger effectiveness of 0.72.}$$

For a cryocooler pressure volume (PV) efficiency of 12 W/W, and using a nominal value for the cryocooler drive electronics, the precooler input power is about 25 W. Assuming the circulation compressor has an isentropic efficiency of 60%, and the expander consumes 3 W, the total system input power for a 3 W heat lift at 35 K is 146 W giving an efficiency of 15.5% Carnot. Using a cryocooler efficiency of 25 W/W and the same values for cryocooler drive electronics, circulation compressor efficiency, and expander power input, the total input power is 156 W for 500 mW heat lift at 10 K, giving an efficiency of 9.3% Carnot.

It is preferred that a flexure/s be used to provide an electrical contact to the piston and also maintain alignment of the piston within the valve plate. The flexure/s is essentially a flat spring made from a photochemically etched metal sheet, such as Kovar or stainless steel, although other materials may be used. It is preferred that the outside edges of the flexure/s be rigidly attached to the valve plate; this may be accomplished by brazing these edges between the expander middle plate halves, while the center of the flexure/s is attached to the piston. The flexure/s center deflects easily up and down (axially), but is very stiff laterally so that piston alignment is maintained.

Figure 10:
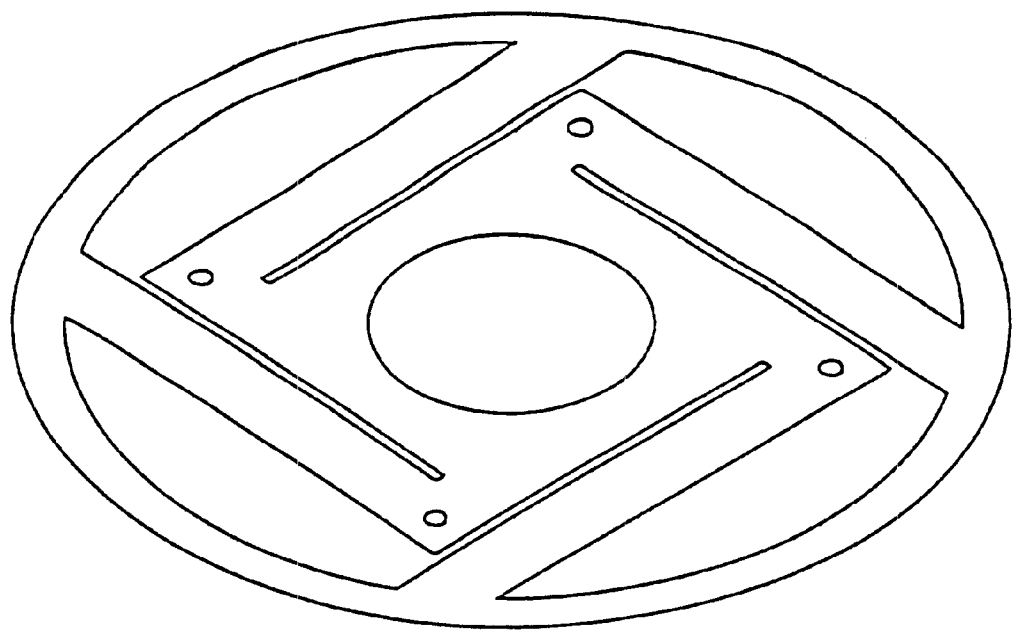
FIG. 10 shows an example of a flexure.

A set of equations based on Roark's Formulas for Stress & Strain, 6$^{th}$ Edition, can be used to design the flexure/s. One preferred flexure design employs 300 series stainless steel sheet that is 0.15 mm thick. The flexure has a square geometry that is 30 mm wide between the clamped edges, which are 2 mm wide. Maximum operational stresses are nearly an order of magnitude below the infinite fatigue strength of the material. An example flexure is shown in FIG. 10.

When used in a cooling system, the expander removes energy from the warm high-pressure gas by transferring energy into a capacitor. Key issues regarding electrode design include the temperature dependence of the dielectric constant and stiction effects when the opposing electrodes that form the capacitor plates make direct contact over large percentages of their surface areas. Since every dielectric material has temperature dependence, temperature changes can dramatically affect the applied voltage required to produce the same force. These characteristics are known to one of ordinary skill in the art.

Changes in the dielectric constant occur with changing temperature, but stiction effects arise due to molecular surface interactions and are a function of surface area. Stiction forces on the order of 140 N/cm$^2$ have been measured for MEMs-scale contacting surfaces. Electrodes separated by thin lands act as standoffs can be used to keep the electrodes from contacting during clamping. Comprising a small percentage of the overall electrode area, the lands can serve to minimize the overall surface area that comes in contact while clamping the piston. Such lands can also provide a means whereby geometry dominates the dielectric constant rather than temperature effects. It can be shown that an effective dielectric constant of 2 minimizes the effect of temperature induced changes in the relative dielectric constant compared to that of a larger value. Materials which might be used for the lands and the main dielectric are lanthanum aluminate ($LaAlO_3$), tantalum oxide ($Ta_2O_5$), aluminimum oxide ($Al_2O_3$) and silicon nitride ($Si_3N_4$), although many others may be used.

A significant dead volume exists to allow for gas flow when filling the device with a gas. This dead volume reduces the amount of cold gas expelled when the expander exhausts and thus increases the frequency of operation for given expansion volume and mass-flow rate. One way to mitigate the dead volume effects is to statically fill the dead volume and then dynamically fill; i.e., fill an additional volume of gas while the piston is moving. After the dynamic fill is complete, the expansion portion of the cycle begins. Practically this is accomplished by determining the force exerted on the piston when the fill volume is at maximum pressure and choosing a voltage that is less than the voltage required for the electrostatic force to exactly match the pressure force. The presence of a force imbalance causes the piston to move and in so doing additional gas can be admitted into the reaction chamber. If the system is controlled so that the electrostatic force is constant as the piston moves, then there will be a constant force differential and a constant acceleration on the piston. Gas is admitted into the ever-increasing volume of the reaction chamber until the valves are closed, and the pressure force and electrostatic force reach equilibrium. These forces equilibrate because the electrostatic force is nearly constant if the leakage current from the capacitors is small; since the piston is moving, the volume is increasing, and, therefore, the pressure is dropping. The pressure will drop until the pressure force is equal to the electrostatic force, and at this point an expansion cycle begins.

Since the electrostatic force falls off inversely as the square of the distance between the electrodes, there should be very little gap between the electrodes when the device is clamped if it is desired that the device operate with moderate supply voltages. This means that as the expander completes its stroke the gap separating the piston from the opposing valve plate when double acting or the braking electrode when single acting will become very small. It is well known that squeeze film effects increase cubically as the distance between two moving surfaces decreases. The net result of the squeeze film effect is to transfer kinetic energy from the piston into a pressure/temperature increase in the gas. For large piston velocities, as the gap between the piston and the valve plate becomes small, squeeze film damping could present a very serious inefficiency to the operation of the expander.

In certain cases the squeeze film effect can be modeled using the isothermal Reynold's equation. With proper design of the surfaces, which separate the piston from the valve plate, and by controlling the discharge characteristics of the expander to moderate the kinetic energy of the piston at the end of the expansion cycle, the impact of the squeeze film effect can be made negligible by design.

Fabrication Example

The key to realizing devices in miniaturized form is a mechanical system not only capable of producing thermodynamic cycles, but which can also be fabricated according to the selected parameters. This invention can be manufactured with a variety of manufacturing steps described in the references by M. Elwenspoek et al. and P. Rai-Choudhury.

A particular fabrication example is given here. It is known that one of ordinary skill in the art could substitute various materials and techniques. Table 1 lists an example of the process steps, the features of the device where the process steps are used, and examples of equipment that can be used to carry out the steps.

To form the main electrodes, a layer of TEOS derived glass is conformally deposited over the valve plate. This is then patterned photolithographically. The electrodes are formed by blanket coating over a masked valve plate using sputter deposition. Prior to deposition, a shadow mask is aligned with features on substrate. After deposition, the metal is polished back to form an embedded electrode. This then has the final dielectric structures deposited over the surface. Electrodes may be formed in the broken wheel configuration where electrodes that are capable of being separately activated are placed around the piston. Care must be exercised so that the layers formed after polishing do not introduce significant stress into the valve plate causing it to deform.

In this specific example the gap dielectric is a 4000 Å layer of $Si_3N_4$. The land dielectric is a 2500 Å $Si_3N_4$ blanket deposited with PECVD or sputtering using shadow masking.

Spacers, for example 1.5 mm thick Kovar spacers that are fabricated at Photofab, for example, are cleaned and plated with 2–4 $\mu$m of Ni followed by 2–4 $\mu$m of Au. Brazing preforms are tacked into the spacer grooves. The plated metal spacer and the preform are painted with flux, placed in a graphite fixture, and heated to a temperature sufficient to form the braze joint. After brazing, the parts are ultrasonically cleaned. Cleanliness is important since particulate between the electrodes can cause the device to fail.

Figure 11:
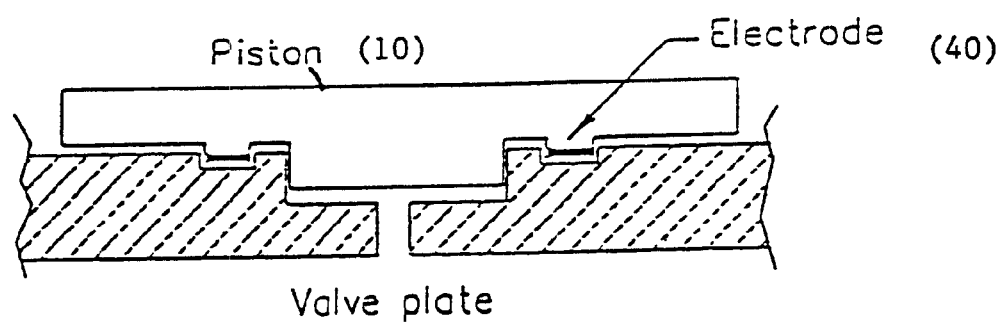
FIG. 11 shows a piston formed with raised electrodes.

The piston plate is the conformally grown piston and support structure. It is conformally formed so that it matches the valve plate features and produces a piston that is matched to the piston housing with very precise and uniform clearances. Piston fabrication also includes groove formation, alignment features for reassembly, mounting holes for connecting to the flexures, and an inset box for brazing the stiffener. In this example a 3–6 $\mu$m conformal layer of a sacrificial layer of a substance such as parylene is deposited onto the valve plate, the cylinder walls within the valve plate, and the brazed spacer seals to form the self aligned electrode structures, the parylene sacrificial layer can be deposited over the structure after the electrode islands have been etched into the TEOS derived $SiO_2$, if desired. Then the plated piston is formed with raised electrodes as seen in FIG. 11. The purpose of these electrodes is to provide centering for the forces when the piston and housing are reassembled.

After parylene coating, while still in the clean environment, the piston is formed into the housing. Electroplated Alloy 42, a 42/58 Ni/Fe alloy, is one example of a suitable substance for the bulk of the piston plate. This is accomplished by seeding the parylene surface with thin conducting layer from an aqueous dip followed by a rinse and the formation of thin high-phosphorous electroless Ni (EN) layer. The bulk of the piston plate is formed by electrolytically plating the alloy from a aqueous bath. To provide a flat backside mounting surface, the plated piston undergoes a polish step prior to release from the valve plate.

The piston and housing are separated thermally. This is accomplished by heating the low temperature co-fired ceramic (LTCC) substrate and cooling the piston sufficiently to separate the plated metal from the parylene surface.

Next, the parylene sacrificial layer is removed from the valve plate via ashing, at 350° C. or less in an $O_3$ ambient. After the bulk sacrificial layer has been removed, the valve plate is cleaned using an $O_2$ plasma. After thorough oxidation, the valve plate is cleaned to remove particulate.

After separation, the piston is machined, either conventionally or using microfabrication techniques to trim back the edges and to form through holes for the mitigation of squeeze film effects. Indexing is from the piston edge and center. To form the fill volume, the piston head is polished down to the specified gap distance.

The piston is attached to the mounting pins in the flexure by soldering the pins into the mounting holes on the back of the piston. After cleaning the mounted piston flexure assembly, solder preforms are tacked into place on the valve plates. The piston and valve plate are then aligned and joined.

The alignment process is accomplished using high precision positioners with differential capacitance feed-back which minimizes capacitance differences between the split electrodes and the piston. The difference signal between the capacitors is minimized by x and y translation of the precision x, y, z stage. After minimizing the difference between each capacitor, the z positioner brings the valve plate closer to the piston. Since the electrodes on the valve plate have been patterned photolithographically, the area of each electrode segment is nearly identical and as the piston moves closer; the differential capacitance values should remain nearly constant. If not, the piston and housing are not level. In this case, the leveling of the stage is used to minimize differential capacitance values. After leveling, the z travel is backed off, and x, y differential capacitance minimization repeated. Finally, the piston is moved completely into contact with the valve plate. End of travel is determined when there is no change in the capacitance of the alignment features for increasing drive current to the positioner. At this point, the alignment circuit is disconnected, and the piston and housing are electrostatically clamped. After alignment of the piston and electrostatically clamping to the electrodes on the midplate and the entire assembly is heated to form the sealing joints.

Figure 12:
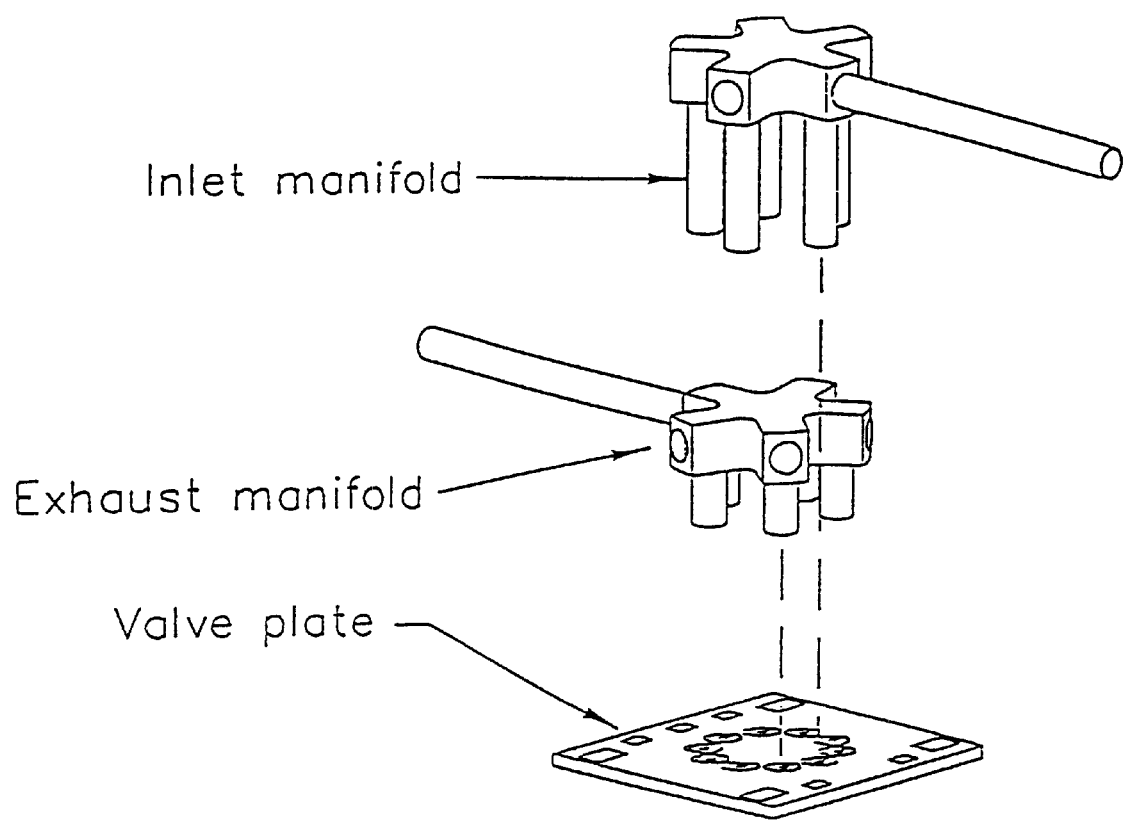
FIG. 12 shows valve manifolds and attachment to the valve plate.
Figure 13:
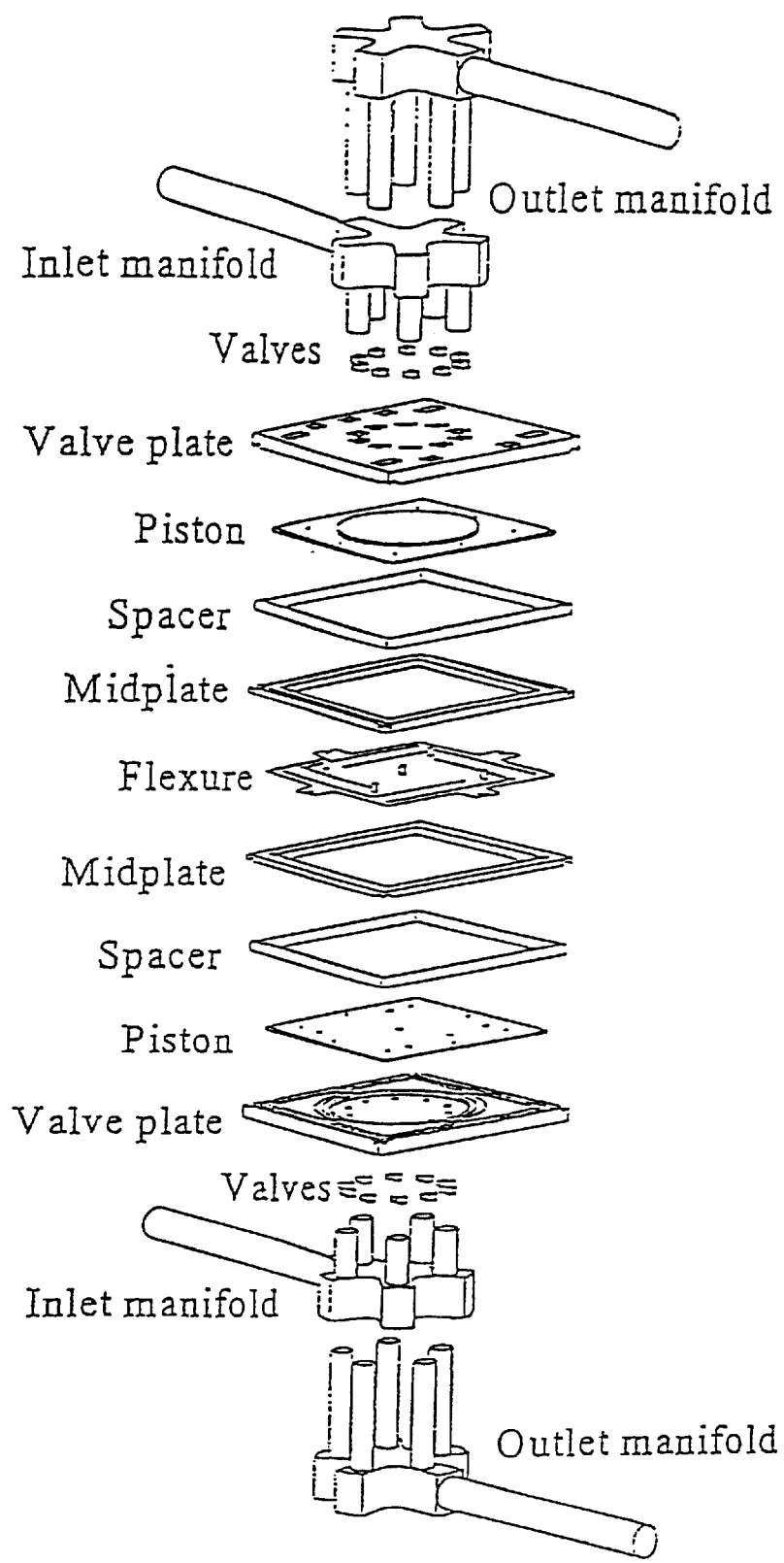
FIG. 13 shows the overall expander assembly.

The valves for the assembly are then attached. Valves such as those disclosed in U.S. Pat. No. 5,380,396 may be used in this device and they may be fabricated with methods consistent with that teaching. The valves are vacuum brazed onto the valve plate providing hermetic mechanically sound seals, which also form one part of the electrical contact to the valve. After mounting, the remaining two electrical contacts to the valves are made using wire bonding. Finally manifolds are mounted in such a way as to form seals around the valves, this can be done using brazing or epoxy bonds. FIG. 12 shows valve manifolds and attachments to a valve plate. FIG. 13 shows the overall expander assembly.

REFERENCES 5,457,956 October 1995 Bowman et al.; 5,941,079 August 1999 Bowman et al; 5,932,940 August 1999 Epstein et al.; 6,109,889 August 2000 Zengerle et al.; 6,106,245 August 2000 Cabuz et al.; 6,109,222 August 2000 Glezer et al.; 5,336,062 August 1994 Richter et al.; 6,019,882 February 2000 Paul et al.; 5,788,468 August 1998 Dewa et al.; 5,871,336 April 1999 Young; 6,157,029 December 2000 Chutjian et al.;5,763,998 June 1998 Colombo et al.; M. Elwenspoek et al., "Silicon Micromachining," Cambridge University Press, 1998; P. Rai-Choudhury (Editor), "Handbook of Microlithography, Micromachining, and Microfabrication," SPIE Press, 1997; K. S. Breuer et al., "Challenges for High-Speed Lubrication in MEMS," book chapter in NanoTribology, Ed. S. Hsu, Kluwer Press (to appear 2000); R. Remsburg, "Advanced Thermal Design of Electronic Equipment," Chapman Hall, 1997. E. Simoen, et. al "The Cryogenic Operation of partially Depleted Silicon-on-Insulator Inverters", IEEE Transactions on Electron Devices, Vol. 42, No. 6, pp. 1100–1105, 1995; P. Ghazavi, et. al "A Numerical Model for MOSFET's from Liquid-Nitrogen Temperature to Room Temperature", IEEE Transactions on Electron Devices, Vol. 42, No. 1, pp. 123–134, 1995; Robert McCarty, "Thermodynamic Properties of Helium 4 from 2 to 1500 K at Pressures to $10^8$ Pa," Journal of Physical and Chemical Reference Data, Vol. 2, No. 4, pp. 923–1042, 1973; M. Piron et al., "Rapid Computer Aided Design Method for Fast-Acting Solenoid Actuators," IEEE Transactions on Industry Applications, Vol. 35, No. 5, pp. 991–999, 1999. M. F. Raman et al., "Position Estimation in Solenoid Actuators," IEEE Transactions on Industry Applications, Vol. 32, No. 3, pp. 552–558, 1996; K. Y. Yuan et al., "A New Algorithm for Coupled Solutions of Electric, Magnetic, and Mechanical Systems in Dynamic Simulation of Solenoid Actuators," IEEE Transactions on Magnetics, Vol. 26, No. 3, pp. 1189–1197, 1990.

All references cited herein are hereby incorporated by reference to the extent not inconsistent with the disclosure herewith. Although the description herein contains much specificity, this should not be construed as limiting the scope of the invention, but as merely providing illustrations of some of the presently preferred embodiments of the invention. For example, in addition to the piston shapes described herein, pistons of other geometrical shape can be used in this invention without changing the operation of the disclosed invention; e.g., cylindrical pistons. In these cases, the housing will conform to the new piston shape. Other designs for valves may be used without fundamentally affecting the operation of the disclosed invention. Other designs for manifolds may be used without fundamentally affecting the operation of the disclosed invention. Other designs for the capacitor structure may be used without fundamentally affecting the operation of the disclosed invention. Other designs for magnetic structures may be used without fundamentally affecting the operation of the disclosed invention. Other designs for an ignition system may be used without fundamentally affecting the operation of the disclosed invention. Other circuit elements can be used in this invention without changing the operation of the disclosed invention. For example, elements may be added such as passive elements such as inductors, transformers, and capacitors arranged into other Thevenin equivalent networks, active devices such as transistors, operational amplifiers etc. We do not wish to be bound by the theory presented herein.

TABLE 1

Process Steps Examples

| Process | Application | Equipment Used | Comments |
|---|---|---|---|
| Metal deposition | Metal electrodes in valve plate, metal electrodes for valve operation | Sputtering system In cleanroom multi target substrate heater (500° C.) ion mill or RF etch | Mo or Ta (3–5 $\mu$m for example) can be used |
| CMP (Chemical Metal Polisher) | Damascene metal with substrate | CMP system metal polish (Mo, Ta, Ni/Co) dielectric polish | |
| Dielectric deposition | Insulation over electrodes in valve plate and valve frame | Sputtering system cleanroom multi-target RF for dielectrics reactive DC ($O_2$ or $N_2$) gas flow control | Barrier Dielectric Film (Ex. $Ta_2O_5$, $Al_2O_3$) can be used at 50 nm, for example; then annealed in $O_2$ |
| CVD - bulk dielectric | Bulk dielectric over thin barrier dielectric | CVD system low-stress $Si_3N_4$ other low stress films | Ex. $Al_2O_3$, $Si_3N_4$ to 1 $\mu$m |
| Photolithography | Pattern features in dielectrics and metals | Pattern generator Mask aligner Photoresist spin coat | |
| Parylene or other conformal coating | Sacrificial layer in piston mold (~3 $\mu$m) | Parylene reactor (or other conformal coating system) Plasma Asher/Etcher (or other removal system) | |
| Electroforming | Match plate piston into expansion cavity in valve plate | Electroplating baths for electroless and electrolyzed depositions (likely Ni/Co or Ni/Fe alloy) | Significant development for tight control of alloy and low stress levels |
| Ceramic hole drilling | Valve holes | Ultrasonic drill or possibly laser drill | |
| Mechanical polishing | Piston backside, valve components | Lapping equipment, precision grinder | |
| Precision cutting substrate | Valve components | Dicing saw | Ceramic may be up to 0.2" thick |
| Precision alignment | Assembled components | Micropositioner class 10 cleanroom vibration isolated bench | |
| Precision welding | Piston and flexure | Micropositioner, precision resistance welder | |
| Chemical Etch | Electrodes | Plasma Etcher, Ultrasonic Batch | |

We claim:

1. A fluid expander comprising:
a housing defining an enclosed work space and having a working fluid, said housing comprising:
a first end forming a first plate of a capacitor;
a piston slidably disposed in the housing for reciprocating motion to define a variable volume within said housing, said piston having a first side forming a second plate of a capacitor, said second plate in connection with said first plate, said connection selected from the group consisting of: electrostatic and magnetic;
an inlet in fluid connection with said variable volume, said inlet for fluid ingress into said variable volume;
an outlet in fluid connection with said variable volume, said outlet for fluid egress from said variable volume; and
a control circuit electrically linked to said piston and said first end which controls the strength of the force between the plates of the capacitor.

2. The device of claim 1, wherein said piston is substantially nonflexible in the movement direction.

3. The device of claim 1, wherein said capacitor plates are not continuous on at least one of said piston or said first end or said second end.

4. The device of claim 3, wherein the capacitor on at least one of said first end or second end or said piston is composed of at least two different materials.

5. A fluid expander comprising:
a housing defining an enclosed work space, said housing comprising:
a first end having at least one inlet and at least one outlet;
a second end having at least one inlet and at least one outlet;
a piston slidably disposed in the housing between said first end and said second end for reciprocating motion to define a variable volume within said housing, said piston having a first side in connection with said first end of said housing and forming a first capacitor, said connection selected from the group consisting of: electrostatic and magnetic, said piston having a second side in electrostatic connection with said second end of said housing and forming a second capacitor;
a control circuit linked to said piston for controlling the strength of the force between said first end and said piston and said second end and said piston.

6. The device of claim 5, wherein said piston is substantially nonflexible in the movement direction.

7. The device of claim 5, wherein said capacitor plates are not continuous on at least one of said piston or said first end or said second end.

8. The device of claim 7, wherein the capacitor on at least one of said first end or second end or said piston is composed of at least two different materials.

9. A method of expanding a gas, said method comprising:
applying a clamping force between a piston slidably disposed in a housing and a first end of said housing, wherein said piston moves toward said first end but does not contact said first end;
allowing a working fluid to enter the space between said first end of said housing and said piston;
releasing the clamping force between said piston and said first end, whereby said piston moves away from said first end and said working fluid is isentropically expanded.

10. A method of expanding a gas, said method comprising:
applying a clamping force between a piston slidably disposed in a housing and a first end of said housing, said housing defining an enclosed work space and said housing comprising a first end having at least one inlet and at least one outlet and a second end having at least one inlet and at least one outlet, wherein said piston moves toward said first end but does not contact said first end;
allowing a working fluid to enter the space between said first end of said housing and said piston;
reducing the clamping force between said piston and said first end, wherein said working fluid is isentropically expanded and said piston moves away from said first end and toward said second end;
applying a clamping force between said piston and said second end of said housing, wherein said piston moves toward said second end but does not contact said second end;
allowing a working fluid to enter the space between said second end of said housing and said piston;
reducing the clamping force between said piston and said second end, wherein said working fluid is isentropically expanded and said piston moves away from said second end and toward said first end.

11. A method of generating power comprising:
placing a combustible substance in the first end of a housing having a first end and a second end and a piston slidably disposed in said housing for reciprocating motion to define a variable volume within said housing, said piston having a first side in connection with said first end of said housing and forming a first capacitor and a second side in connection with said second end of said housing and forming a second capacitor, said connection selected from the group consisting of: electrostatic and magnetic; energizing said piston by applying a force to said piston so that said piston is moved toward said first end;
igniting said combustible substance, thereby increasing the temperature and pressure in said first end;
reducing the force on said piston;
allowing said combustible substance to expand against said piston, thereby generating power.

12. The method of claim 11, further comprising transferring said power through a circuit.

13. The method of claim 11, further comprising:
placing a combustible substance in the second end of said housing;
energizing said piston by applying a force to said piston so that said piston moves toward said second end;
igniting said combustible substance, thereby increasing the temperature and pressure in said second end;
reducing the force on said piston;
allowing said combustible substance to expand against said piston, thereby generating power.

14. The method of claim 11, further comprising:
transferring said power from said housing through a circuit.

15. A method of generating power comprising:
applying a clamping voltage between the first end of a housing and a piston slidably disposed in said housing and in electrical or magnetic connection with first end of said housing;
admitting heated gas or fluid into the first end of a housing;
reducing the clamping force on said piston;
allowing said piston to expand away from said first end, thereby generating power.

16. The method of claim 15, further comprising:
transferring said power from said housing through a circuit.

17. A method of pumping a substance comprising:
placing a compressible substance in the first end of a housing having a first end having at least one inlet and at least one outlet, a second end having at least one inlet and at least one outlet, a piston slidably disposed in the housing between said first end and said second end for reciprocating motion to define a variable volume within said housing, said piston having a first side in electrostatic or magnetic connection with said first end of said housing and forming a first capacitor, said piston having a second side in electrostatic connection with said second end of said housing and forming a second capacitor;
energizing said piston by applying a force to said piston so that the piston moves toward said first end, whereby the temperature and pressure of the compressible substance are increased;
removing said compressible substance from the first end of said housing.

18. The method of claim 17, further comprising placing a compressible substance in the second end of said housing, energizing said piston by applying a force to said piston so that the piston moves toward said second end, whereby the temperature and pressure of the compressible substance are increased; removing said compressible substance from the second end of said housing.

19. A cooling system comprising:
a cooler in thermal connection with an object to be cooled;
a compressor comprising a housing having a first end having at least one inlet and at least one outlet, a second end having at least one inlet and at least one outlet,
a piston slidably disposed in the housing between said first end and said second end for reciprocating motion to define a variable volume within said housing, said piston having a first side in connection with said first end of said housing and forming a first capacitor, said connection selected from the group consisting of: electrostatic and magnetic, said piston having a second side in electrostatic connection with said second end of said housing and forming a second capacitor; and means for providing control to said device, said compressor in fluid or gas connection with said cooler;

a heat exchanger in fluid or gas connection with said compressor and said cooler.

20. A cooling system comprising:

a precooler;

a compressor in fluid connection with said precooler;

a first heat exchanger in fluid connection with said compressor;

an expander in fluid or gas connection with said first heat exchanger, said expander comprising a first end having at least one inlet and at least one outlet, a second end having at least one inlet and at least one outlet, a piston slidably disposed in the housing between said first end and said second end for reciprocating motion to define a variable volume within said housing, said piston having a first side in connection with said first end of said housing and forming a first capacitor, said connection selected from the group consisting of: electrostatic and magnetic, said piston having a second side in electrostatic connection with said second end of said housing and forming a second capacitor;

a second heat exchanger in fluid or gas connection with said expander;

control electronics which are in electrical connection with said expander and said compressor.

21. The cooling system of claim 20, which provides cooling at 150K or below.

22. The cooling system of claim 20, which provides cooling at 70K or below.

23. The cooling system of claim 20, which provides cooling at 45K or below.

24. The cooling system of claim 20, which provides cooling at 35K or below.

25. The cooling system of claim 20, which provides cooling at 10K or below.

26. A cooling system comprising:

a precooler;

a compressor in fluid connection with said precooler;

a first heat exchanger in fluid connection with said compressor;

an expander in fluid connection with said first heat exchanger, said expander comprising:

a first end having at least one inlet and at least one outlet;

a second end having at least one inlet and at least one outlet;

a piston slidably disposed in the housing between said first end and said second end for reciprocating motion to define a variable volume within said housing, said piston having a first side in connection with said first end of said housing and forming a first capacitor, said connection selected from the group consisting of: electrostatic and magnetic, said piston having a second side in electrostatic connection with said second end of said housing and forming a second capacitor, said expander in fluid connection with said cooler;

a second heat exchanger in fluid connection with said expander;

control electronics in electrical connection with said expander and said compressor.

27. A method for mechanical voltage/energy conversion comprising:

applying a force between a first end of a housing and a piston in a housing having a first end having at least one inlet and at least one outlet, a second end having at least one inlet and at least one outlet, and a piston slidably disposed in the housing between said first end and said second end for reciprocating motion to define a variable volume within said housing, said piston having a first side in connection with said first end of said housing and forming a first capacitor, said connection selected from the group consisting of:

electrostatic and magnetic, said piston having a second side in electrostatic connection with said second end of said housing and forming a second capacitor;

opening said inlet to said first end;

inserting gas into said first end through said inlet;

reducing the force between said first end and said piston so that said piston is able to move;

closing the inlet valve to said first end, whereby the gas in said first end expands, increasing the electrical potential between the first end and the piston.

28. A device containing a dielectric structure, which minimizes temperature effects in the dielectric, said device comprising:

a first end having one dielectric constant;

a piston slidably disposed in the device for reciprocating motion to define a variable volume within said device, said piston having a first side having a different dielectric constant than said first end, said piston in connection with said first end of said device and forming a first capacitor, said connection selected from the group consisting of: electrostatic and magnetic.

29. A method for operating an electrostatic piston in a device comprising a housing having a first end having an inlet and an outlet and a second end having an inlet and an outlet; a piston slidably disposed in the housing between said first end and said second end for reciprocating motion to define a variable volume within said housing, said piston having a first side in connection with said first end of said housing, said connection selected from the group consisting of: electrostatic and magnetic, and forming a first capacitor or electromagnetic force member, said piston having a second side in connection with said second end of said housing and forming a second capacitor or electromagnetic force member, said method comprising:

opening the inlet to the first end comprising:

placing an compressible substance in a first end;

closing the inlet to the first end;

compressing said compressible substance by electrostatically energizing the piston toward the first end with the inlet to the second end open and the outlet to the second end closed;

opening the outlet to the first end until the desired amount of compressible substance is removed, but before all the compressible substance is removed;

closing the outlet to the first end;

clamping the piston by applying an appropriate force and further increasing the pressure of the remaining compressible substance;

reducing the force between the piston and the electrostatically/electromagnetically energized member of the first end so that the energy of the compressed substance causes the piston to accelerate toward the second end;

opening the inlet to the first end.

\* \* \* \* \*

UNITED STATES PATENT AND TRADEMARK OFFICE
CERTIFICATE OF CORRECTION

PATENT NO. : 6,595,006 B2
DATED : July 22, 2003
INVENTOR(S) : Thiesen et al.

It is certified that error appears in the above-identified patent and that said Letters Patent is hereby corrected as shown below:

Column 1,
Lines 15-20, replace the paragraph under "STATEMENT REGARDING FEDERALLY SPONSORED RESEARCH OR DEVELOPMENT" with -- Portions of this invention were made with U.S. Government support under Contract Numbers F29601-00-C-0188 and F29601-01-C-0146 awarded by the Air Force and this invention was made with Government support under contract NAS2-01042 and NAS2-02051 awarded by NASA. The U.S. government has certain rights in this invention. --

Column 18,
Line 38, replace "$X_f$" with -- $x_f$ --.

Column 26,
Line 9, replace "$T_1$" with -- $T_i$ --

Signed and Sealed this

Thirteenth Day of July, 2004

JON W. DUDAS
*Acting Director of the United States Patent and Trademark Office*